(12) United States Patent
Grube et al.

(10) Patent No.: US 8,621,265 B2
(45) Date of Patent: Dec. 31, 2013

(54) COMPUTING CORE APPLICATION ACCESS UTILIZING DISPERSED STORAGE

(71) Applicants: Gary W. Grube, Barrington Hills, IL (US); Timothy W. Markison, Mesa, AZ (US)

(72) Inventors: Gary W. Grube, Barrington Hills, IL (US); Timothy W. Markison, Mesa, AZ (US)

(73) Assignee: Cleversafe, Inc., Chicago, IL (US)

( * ) Notice: Subject to any disclaimer, the term of this patent is extended or adjusted under 35 U.S.C. 154(b) by 0 days.

(21) Appl. No.: 13/753,444

(22) Filed: Jan. 29, 2013

(65) Prior Publication Data

US 2013/0145232 A1  Jun. 6, 2013

Related U.S. Application Data

(63) Continuation of application No. 12/755,225, filed on Apr. 6, 2010.

(60) Provisional application No. 61/230,304, filed on Jul. 31, 2009.

(51) Int. Cl.
*G06F 11/00* (2006.01)

(52) U.S. Cl.
USPC ............................ 714/6.1; 709/223; 709/224

(58) Field of Classification Search
USPC .......................................................... 714/6.1
See application file for complete search history.

(56) References Cited

U.S. PATENT DOCUMENTS

| | | | |
|---|---|---|---|
| 7,546,427 B2* | 6/2009 | Gladwin et al. | 711/154 |
| 7,996,711 B2* | 8/2011 | Edwards et al. | 714/6.11 |
| 8,171,380 B2* | 5/2012 | Yang et al. | 714/774 |
| 8,209,363 B2* | 6/2012 | Palthepu et al. | 707/822 |
| 8,352,719 B2* | 1/2013 | Grube et al. | 713/2 |
| 2007/0079082 A1* | 4/2007 | Gladwin et al. | 711/154 |
| 2008/0086677 A1* | 4/2008 | Yang et al. | 714/763 |
| 2009/0094320 A1* | 4/2009 | Palthepu et al. | 709/203 |
| 2011/0228931 A1* | 9/2011 | Grube et al. | 380/201 |
| 2011/0231699 A1* | 9/2011 | Gladwin et al. | 714/6.2 |
| 2011/0231733 A1* | 9/2011 | Cilfone et al. | 714/763 |
| 2012/0001778 A1* | 1/2012 | Steiner et al. | 341/94 |
| 2012/0054500 A1* | 3/2012 | Dhuse et al. | 713/189 |
| 2012/0137091 A1* | 5/2012 | Grube et al. | 711/158 |
| 2012/0137095 A1* | 5/2012 | Grube et al. | 711/162 |
| 2012/0163596 A1* | 6/2012 | Grube et al. | 380/252 |
| 2012/0166813 A1* | 6/2012 | Grube et al. | 713/189 |
| 2012/0166907 A1* | 6/2012 | Grube et al. | 714/755 |
| 2012/0226667 A1* | 9/2012 | Volvovski et al. | 707/689 |
| 2012/0226714 A1* | 9/2012 | Resch et al. | 707/781 |
| 2012/0226855 A1* | 9/2012 | Dhuse | 711/114 |
| 2012/0226933 A1* | 9/2012 | Baptist et al. | 714/6.2 |
| 2012/0278682 A1* | 11/2012 | Yang et al. | 714/763 |
| 2013/0013960 A1* | 1/2013 | Gladwin et al. | 714/6.3 |
| 2013/0013961 A1* | 1/2013 | Gladwin et al. | 714/15 |
| 2013/0014254 A1* | 1/2013 | Gladwin et al. | 726/22 |

\* cited by examiner

*Primary Examiner* — Kamini Patel
(74) *Attorney, Agent, or Firm* — Garlick & Markison; Timothy W. Markison

(57) ABSTRACT

A computing core includes a processing module, main memory, and a memory controller. The memory controller receives a request to store a data result from a processing module and determines whether to store the data result in an error encoded format. When the memory controller determines to store the data result in the error encoded format, it facilitates encoding the data result in accordance with a dispersed storage error coding function to produce one or more sets of encoded data slices. The memory controller then determines where to store the one or more sets of encoded data slices and provides the one or more sets of encoded data slices to one or more identified memories for storage.

14 Claims, 24 Drawing Sheets

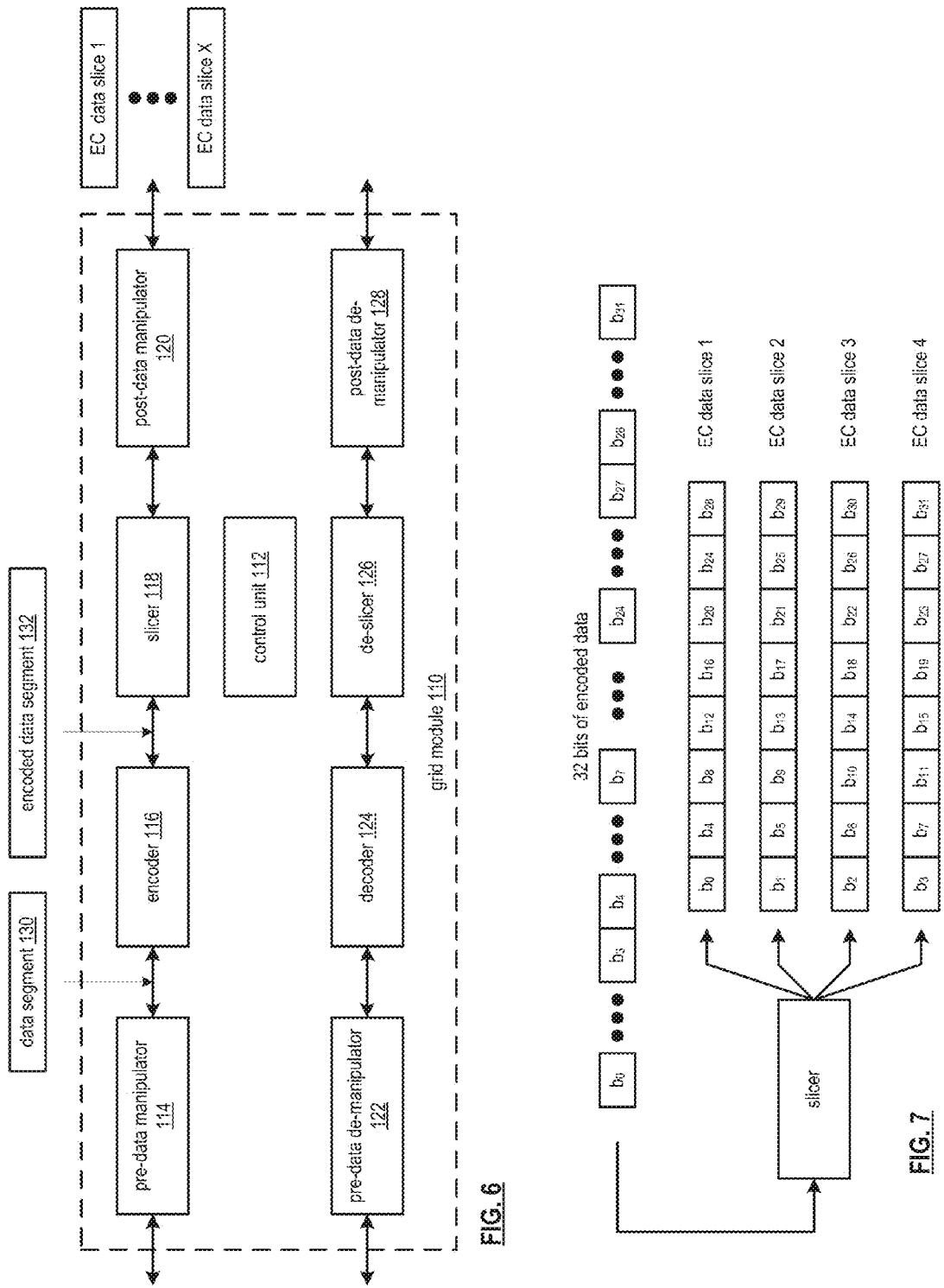

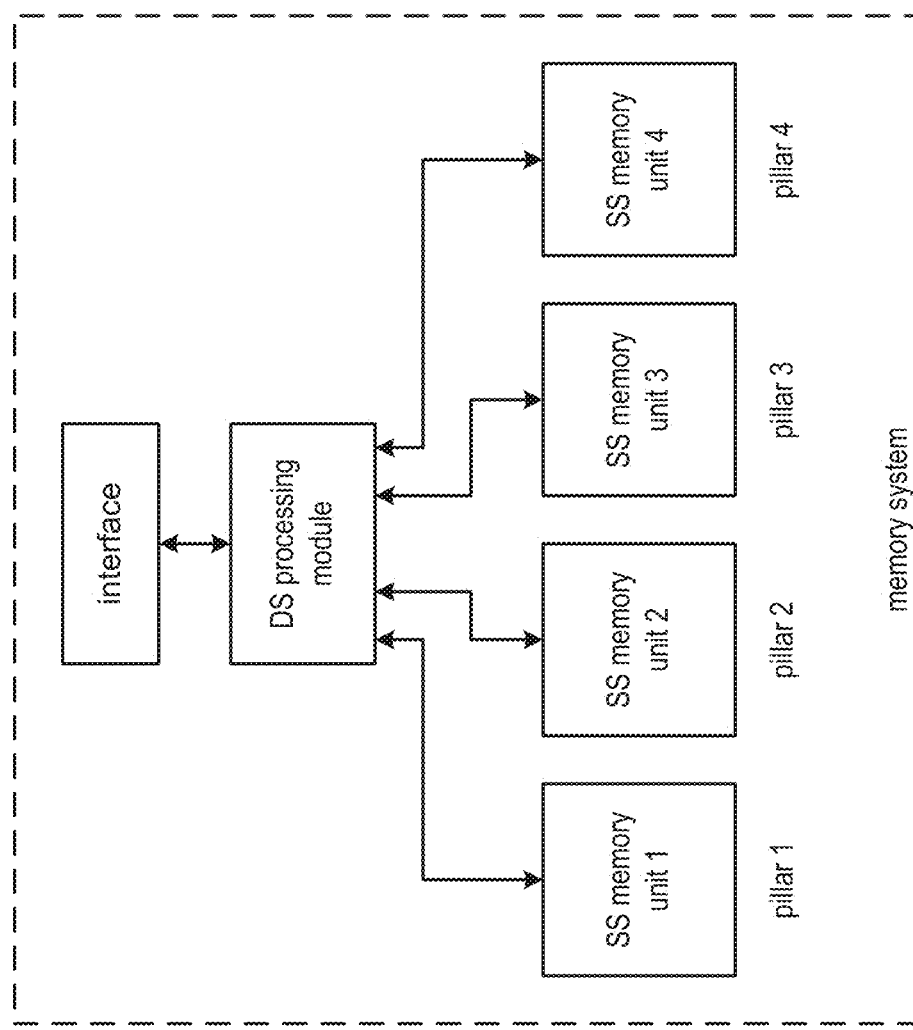

COMPUTING CORE APPLICATION ACCESS UTILIZING DISPERSED STORAGE

CROSS REFERENCE TO RELATED PATENTS

This patent application is claiming priority under 35 USC §120 as a continuing patent application of co-pending patent application entitled, "Computing Core Application Access Utilizing Dispersed Storage", having a filing date of Apr. 6, 2010, and a Ser. No. 12/755,225, which is incorporated herein in its entirety by reference. U.S. patent application Ser. No. 12/755,225 claims priority under 35 USC §119 to a provisionally filed patent application entitled, "Computing System Utilizing Dispersed Storage", having a provisional filing date of Jul. 31, 2009, and a provisional Ser. No. of 61/230,304.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computing systems are known to communicate, process, and store data. Such computing systems range from wireless smart phones to data centers that support millions of web searches, stock trades, or on-line purchases every day. Computing processing is known to manipulate data from one form into another. For instance, raw picture data from an image sensor may be compressed and/or manipulated in accordance with a picture compression standard to produce a standardized compressed picture that can be saved or shared with others.

With continued advances in computing processing speed and communication speed, computers manipulate real time media from voice to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computing system is constructed, and hence operates, in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computing systems.

A typical computer storage function includes one or more memory devices aligned with the needs of the various operational aspects of the computer system's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus are typically used for secondary memory (e.g., hard drive, backup memory, etc.).

Computer system storage standards include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). Such standards specify the data storage format (e.g., files, data objects, data blocks, directories, etc.) and interface between the computer system's processing function and the memory devices. Typically a memory controller provides the interface function between the processing function and the memory devices and will have to change as new storage systems are developed.

Despite the standardization of the computer system and its memory, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to the computing system.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of one or more discs will not result in the loss of the original data. For example, RAID 5 uses three discs to protect data from the failure of a single disc. The parity data, and associated redundancy overhead data, reduces the storage capacity of three independent discs by one third (e.g., n-1=capacity). RAID 6 can recover from a loss of two discs and requires a minimum of four discs with a storage capacity of n-2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

Therefore, a need exists for a data storage solution that provides more reliable storage of data, minimizes adverse affects of multiple memory elements failures, provides improved security, is adaptable to a wide variety of storage system standards, and/or is compatible with computing and communications systems.

BRIEF DESCRIPTION OF THE SEVERAL VIEWS OF THE DRAWING(S)

FIG. 6 is a schematic block diagram of an embodiment of a grid module in accordance with the invention;

FIG. 7 is a diagram of an example embodiment of error coded data slice creation in accordance with the invention;

FIG. 25 is a schematic block diagram of another embodiment of a memory system in accordance with the invention.

DETAILED DESCRIPTION OF THE INVENTION

Figure 1:
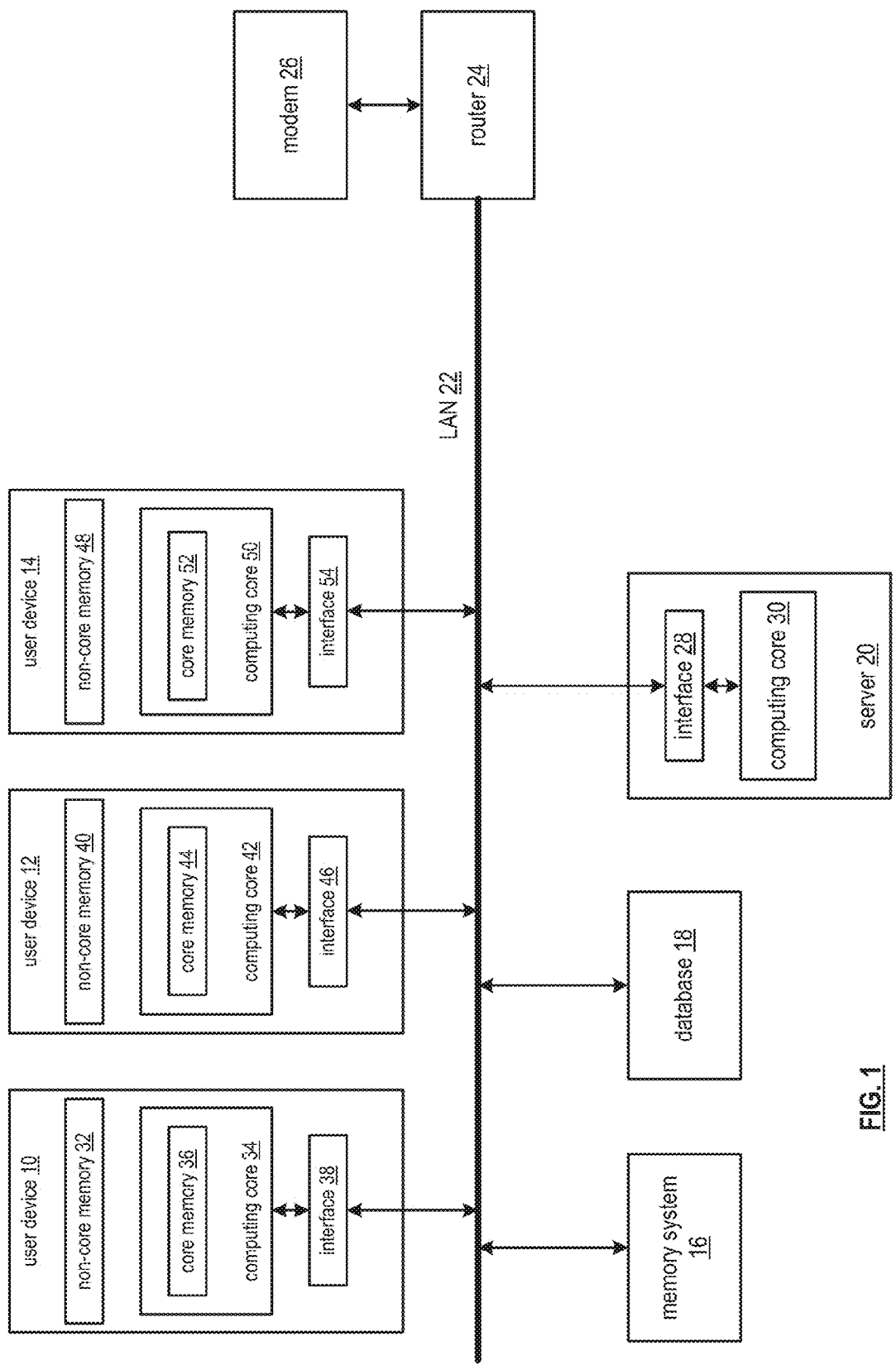
FIG. 1 is a schematic block diagram of an embodiment of a computing system in accordance with the invention.

FIG. 1 is a schematic block diagram of an embodiment of a computing system that includes user devices 10-14, a memory system 16, a database 18, a server 20, a local area network (LAN) 22, a router 24, and a modem 26. Each of the user devices 10-14 may be a portable device or a fixed device. For example, a portable device may be a cell phone, a smart phone, a personal digital assistant, a digital music player, a digital video player, a laptop computer, a handheld computer, a video game controller, and/or any other portable computing equipment. A fixed device may be a personal computer, a computer server, a cable set-top box, a satellite receiver, a television set, a printer, a fax machine, home entertainment equipment, a video game console, and/or any type of home or office computing equipment.

Each of the user device 10-14 includes a computing core 34, 42, 50, non-core memory 32, 40, 48, and an interface 38, 46, 54 to communicate with the LAN 22. The interface 38, 46, 54 accommodates one or more storage system standards such that the user device 10-14 can utilize a storage standard native to its operating system and/or the DSN protocol. The non-core memory 32, 49, 48 is memory outside of the computing core 34, 42, 50 but closely associated with the computing core 34, 42, 50. For example, non-core memory 32, 49, 48 may include a hard disk drive, an external FLASH memory, and an external DSN memory. The computing core 34, 42, 50 may include the processing module, a core memory (main memory) 36, 44, 52, and the memory controller as will be described in greater detail with reference to FIG. 2.

In addition, each of the memory system 16, the database 18, the server 20, the router 24, and the modem 26 may be a portable device or a fixed device or may be a functional module within another unit that is a portable device or a fixed device. For example, the server 20 may be a computer server and the memory system 16 may be a functional module operating on the server 20. In another example, the server 20 may be a functional module operating on one of the user devices 10-14.

The LAN 22 may be a wire line and/or wireless communication system or system of systems that provide communications capability between the user devices 10-14, the memory system 16, the database 18, the server 20, and the router 24. The system of systems may be a combination of private intranets and/or the public internet systems.

The modem 26, which may be a wire line or wireless modem, provides coupling between the LAN 22 and another network, which may be a wire line and/or wireless wide area network (WAN) communication system or system of systems that provide communications capability between the other network and the LAN 22. In an example, the modem 26 accesses the other network via an optical sub-network. In another example, the modem 26 accesses the other network via a 4G Long Term Evolution (LTE) wireless network.

The router 24 interfaces the LAN 22 with the other network such that data is forwarded from the other network to the LAN 22 and from the LAN 22 to the other network. The router 24 may be a wire lined and/or wireless capable to communicate with the other devices sharing the LAN 22.

The database 18 may include one or more storage devices to centralize storage of data. The data may include a data file, data blocks, a real time data stream, and/or any other type of digital information. For example, the database 18 has an access protocol that mimics a conventional file system interface (e.g., file system (NFS), flash file system (FFS), disk file system (DFS), small computer system interface (SCSI), internet small computer system interface (iSCSI), file transfer protocol (FTP), web-based distributed authoring and versioning (WebDAV), etc.). As another example, the database 18 may utilize a dispersed storage network (DSN) protocol as will be described with reference to one or more of FIGS. 3-8.

The server 20 includes an interface 28 and a computing core 30. The interface 28 provides communication with the LAN 22 and accommodates one or more storage system standards such that the server 20 can utilize a storage standard native to its operating system and/or the DSN protocol. The server 20 facilitates storage and retrieval of data files, system programs, and/or user applications requested by the user device 10-14. Note that the data files, system programs, and/or user applications are stored in a dispersed fashion amongst one or more of the user devices 10-14, the memory system 16, the database 18, the server 20, the router 24, the modem 26, and/or another network via the modem 26. The method of storing and retrieval of data files, system programs, and/or user applications will be discussed in greater detail with reference to one or more of FIGS. 2-25.

The memory system 16 may include one or more storage devices and a computing core to facilitate the storage of data. The data may include a data file, data blocks, a real time data stream, and/or any other type of digital information. For example, the memory system 16 may include an access protocol that mimics a conventional file system interface and may be any one or more of network file system (NFS), flash file system (FFS), disk file system (DFS), small computer system interface (SCSI), internet small computer system interface (iSCSI), file transfer protocol (FTP), and web-based distributed authoring and versioning (WebDAV). As another example, the memory system 16 may utilize a dispersed storage network (DSN) protocol as will be described in greater detail with reference to FIGS. 3-8.

In an example of data storage, a computing core of a user device 10-14 generates sets of error coded (EC) data slices from the data using an error coding dispersal function (e.g., forward error correction, erasure code, IDA, Reed-Solomon, convolutional coding, Trellis coding, Turbo coding, etc.). For example, the computing core may generate the EC data slices by dividing the data (or data object) into Y data segments, error code each of the Y data segments, and slice an encoded data segment into X (e.g., # of pillars) EC data slices; thus creating XY total error coded data slices from the data, or data object. The number of pillars X per data segment is based on the error coding dispersal function and the size of a data segment may be a fixed size (e.g., 1 MB), may be a variable size to achieve a fixed number of data segments (e.g., Y=size of data/# of segments), or may be a variable size for a varying number of segments.

After generating the EC slices for a data segment, the computing core 34, 42, or 50 determines where to store them. For example, the computing core may determine to store the EC data slices in core memory, in non-core memory, in the memory system 16, in the database 18, and/or on the network via the router 24 and the modem 26. As a specific example, the computing core may determine to store the EC data slices in memory devices of the core memory, in memory devices of the non-core memory, in memory devices of the memory system, in memory devices of the database, or in memory devices of the network. As another specific example, the computing core may determine to store the EC data slices across the various memories. For instance, one or more EC data slices may be stored in core memory, one or more EC data slices may be stored in non-core memory, one or more slices in the memory system, one or more slices in the database, and one or more slices on network memory. Such a determination may be based on one or more of a resiliency goal, a performance goal, a cost goal, a memory utilization metric, a predetermined pattern, a user driven pattern, a prioritization algorithm, a data object type to DSN level mapping, and/or any other factor regarding effectiveness and/or performance of data storage.

Having determined where to store the EC data slices of a data segment, the computing core addresses X memory devices of the targeted memory for storing the EC data slices. In this manner, each EC data slice of a data segment is stored on a different memory device, which allows for multiple memory devices (e.g., X-T, where T is the read threshold for the error coding dispersal function) to fail and the data segment to still be accurately recovered. The computing core 34, 42, 50 saves the storage locations of the EC data slices in a table to facilitate subsequent retrieval of the data segment.

In an example of data retrieval, a computing core 34, 42, 50 of a user device 10-14 determines where the desired EC data slices are stored using the table of storage locations. Having identified the memory devices storing the EC data slices, the computing core 34, 42, or 50 addresses the memory devices (e.g., core memory, non-core memory, memory system, the database, LAN storage, WAN storage) to retrieve the EC data slices. Once the computing core 34, 42, or 50 has received a read threshold number of EC data slices, it decodes them in accordance with the error coding dispersal function to recapture the original data segment.

As another example of operation, the computing core 34, 42, 50 may move EC data slices between the layers of memory hierarchy of the computer system (e.g., core memory, local non-core memory and non-local non-core memory such as the memory system, the database, and the network memory). For instance, the computing core may move EC data slices from the core memory to the local non-core memory or to the non-local non-core memory as may be required while executing one or more user and/or system applications.

Figure 2:
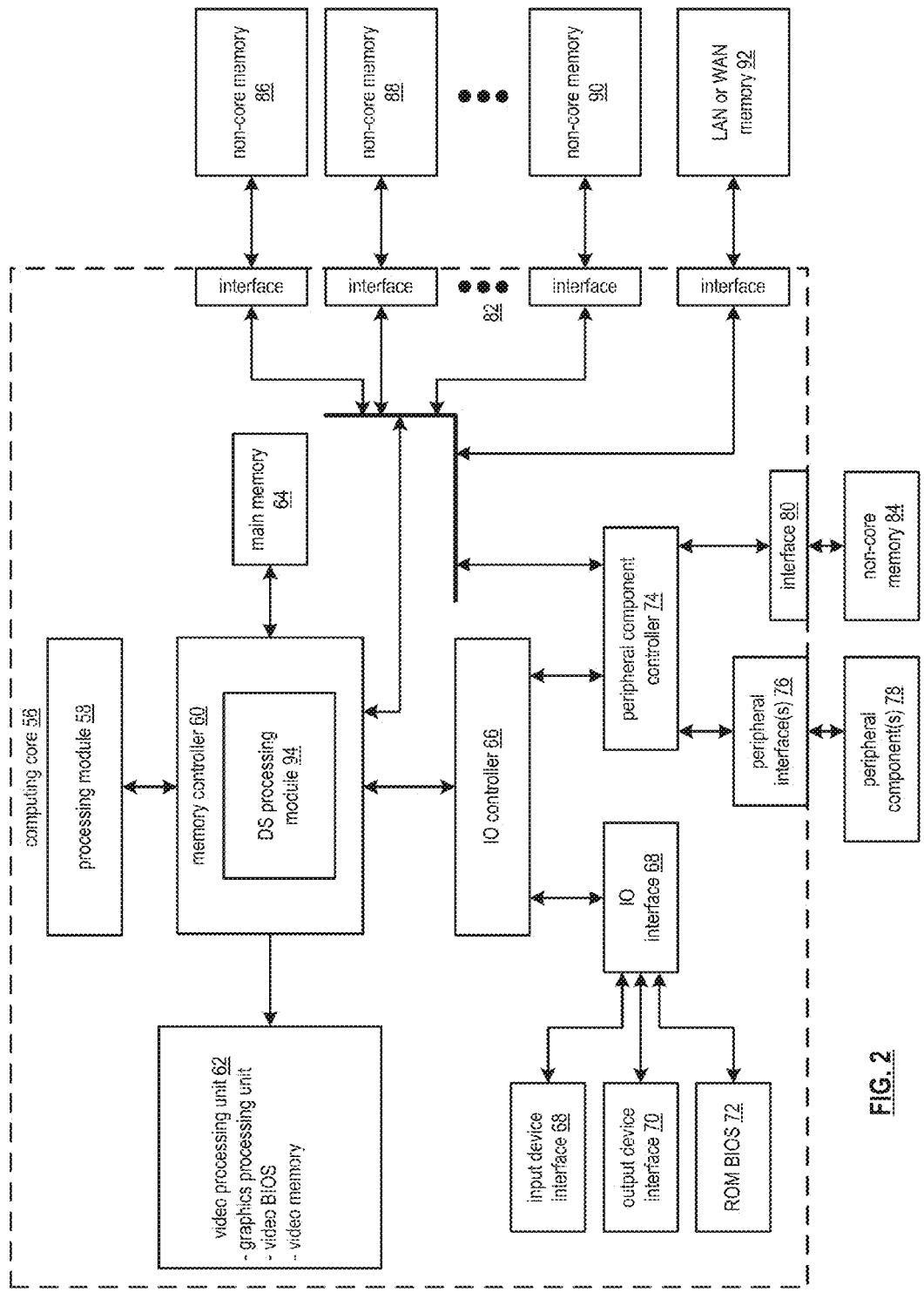
FIG. 2 is a schematic block diagram of an embodiment of a computing core in accordance with the invention.

FIG. 2 is a schematic block diagram of an embodiment of a computing core 56 that includes one or more of a processing module 58, a memory controller 60, a video processing unit 62, a main memory 64 (e.g., core memory), an input output (IO) controller 66, an input output (IO) interface 68, an input device interface module 69, an output device interface module 70, a read only memory basic input output system (ROM BIOS) 72, a peripheral component interconnect (PCI) interface 74, a peripheral interface(s) 76, and a plurality of interfaces 80-82. The memory controller 60 includes a dispersed storage (DS) processing module 94.

The processing module 58 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-25. In general, the processing module 58 coordinates a majority of the tasks (e.g., execute one or more operation instructions of an algorithm, perform an interrupt, perform a co-processing function, process data, store data to memory, read data from memory, etc.) performed by the computing core 56.

The IO controller 66 provides access to the memory controller 60 for typically slower devices via the IO interface 68 and/or the peripheral component interface 74. The peripheral component interface 74 is coupled to one or more peripheral interfaces 78 and a plurality of memory interfaces 80 and 82. The IO interface 68 is coupled to one or more input device interfaces 69, one or more output device interfaces 70, and a ROM BIOS module 72. Each of the interfaces 69, 70, 76, 80, and 82 includes hardware and/or software to support the electrical, functional, and/or mechanical coupling of the corresponding component to the computing core 56. For example, the input device interface 69 couples an input device (e.g., mouse, keyboard, microphone, etc.) to the computing core; the output device interface 70 couples an output device (e.g., monitor, printer, speaker, etc.) to the computer core; and the peripheral interface 76 couples a peripheral component 78 (e.g., digital image sensor, a sound card, a USB memory, a hard disk controller, a TV tuner, and/or any other computer peripheral) to the computing core.

The memory interfaces 80 and 82 couple memory devices (e.g., non-core 84-90, LAN and/or WAN memory 92) to the computing core. For example, one of the memory interfaces 82 may couple a local area network (LAN) and/or wide area network (WAN) memory device 92 to the computing core in accordance with a NFS standard, DSN protocol, and/or other standardized protocol. The memory interface 80 may couple a non-core flash memory to the computing core in accordance with a flash file system (FFS) standard, a DSN protocol, and/or other standardized protocol. A hard drive may interface with the interface utilizing a disk file system (DFS). One of the memory interfaces 82 may couple a non-core hard drive to the computing core in accordance with NFS, FFS, DFS, DSN and/or other standardized protocol. The DSN protocol will be described in greater detail with reference to one or more of FIGS. 3-25.

Each of the memories (e.g., the main memory 64, the ROM BIOS 72, the non-core flash memory 84, the non-core hard drive 86-90, and the LAN and/or WAN memory 92) may include a plurality of separately addressable memory devices. Each of the separately addressable memory devices may store one or more error coded (EC) data slices of data. For example, if a data object is divided into 10 data segments and each data segment is error encoded and sliced into 8 EC data slices, then a first memory device will store the first EC slices of each data segment, a second memory device will store the second EC data slices of each data segment, and so on.

At the start-up or rebooting of the device incorporating the computing core, the processing module 58 retrieves, and subsequently executes, a basic input output system (BIOS) program (e.g., instructions to initialize and test at least some of the hardware and/or software elements of the computing core 56 and/or the device) from the ROM BIOS 72 and/or other memory location. For example, all of the BIOS executable instructions may be stored in the ROM BIOS 72 as a plurality of EC data slices. In this example, the DS processing module 94 of the memory controller 94 decodes the EC data slices in accordance with an error coding dispersal function to retrieve the BIOS program. Alternatively, the processing module 58 may include a DS processing function to decode the EC data slices.

In another example, the BIOS program is encoded as a plurality of EC data slices, where some of the slices are stored in the ROM BIOS 72 and the remaining slices are stored in the LAN and/or WAN memory 92. In this instance, the DS processing module 94 retrieves the slices and reconstructs the instructions of the BIOS program therefrom. In another example, the BIOS program is encoded as a plurality of EC data slices, which are stored in the LAN and/or WAN memory 92. In this instance, the ROM BIOS 72 may store pointer information regarding the LAN and/or WAN memory 92 storing the BIOS program. As yet another example, the ROM BIOS 72 may store the instructions, or a sub-set of instructions, of the BIOS program in a raw format (e.g., non-encoded). The ROM BIOS 72 and access thereof will be discussed in greater detail with reference to one or more of FIGS. 9, 11-13, and 15-16.

Once the BIOS program is executed or during its execution, the processing module 58 and/or the memory controller 60 retrieves an operating system (OS) and the processing module 58 executes instructions of the OS. For example, the memory controller 60 retrieves instructions of the operating system (OS) from non-core memory 84-90 and/or the LAN-WAN memory 92 and stores the instructions in main memory 64. The OS may be stored in non-core memory 84-90 and/or LAN-WAN memory 92 in a raw format and/or in an error coding dispersal function format (i.e., as EC data slices). If the OS is stored as EC data slices, the DS processing module 94 decodes them prior to providing them to the processing module 56.

When the OS is operational, the processing module 56, via the memory controller 60, may retrieve user applications (e.g., work processing, database, spreadsheet, drawing, web browser, etc.) and/or system applications from the non-core memory 84-90 and/or the LAN-WAN memory 92. The user and/or system applications may be stored in non-core memory 84-90 and/or LAN-WAN memory 92 in a raw format and/or in an error coding dispersal function format (i.e., as EC data slices). If the user and/or system applications are stored as EC data slices, the DS processing module 94 decodes them prior to providing them to the processing module 56.

As the processing module 56 is executing a user application and/or system application, it may requiring the reading and/or writing of data to the memory of the device (e.g., main memory, non-core memory 84-90, and/or LAN-WAN memory 92). For writing of data, the memory controller 60 creates EC data slice (in pillars) of the data and disperses them for storage across main memory 64, non-core memory 84-90, and/or LAN and/or WAN memory 92. For reading of data, the memory controller 60 addresses the memory devices storing the EC data slices of the requested data. When a threshold number of the EC data slices are received for a given data segment, the DS processing module 94 reconstructs the data segment from the received EC data slices.

As another example, the memory controller 60 may store and retrieve data in the main memory in a raw format for use by the processing module 56. When the data in main memory is to be written to non-core memory, the DS processing module encodes the data and disperses the EC data slices to the non-core memory. The method of retrieving user application executable instructions will be discussed in greater detail with reference to FIGS. 18-19.

Figure 3:
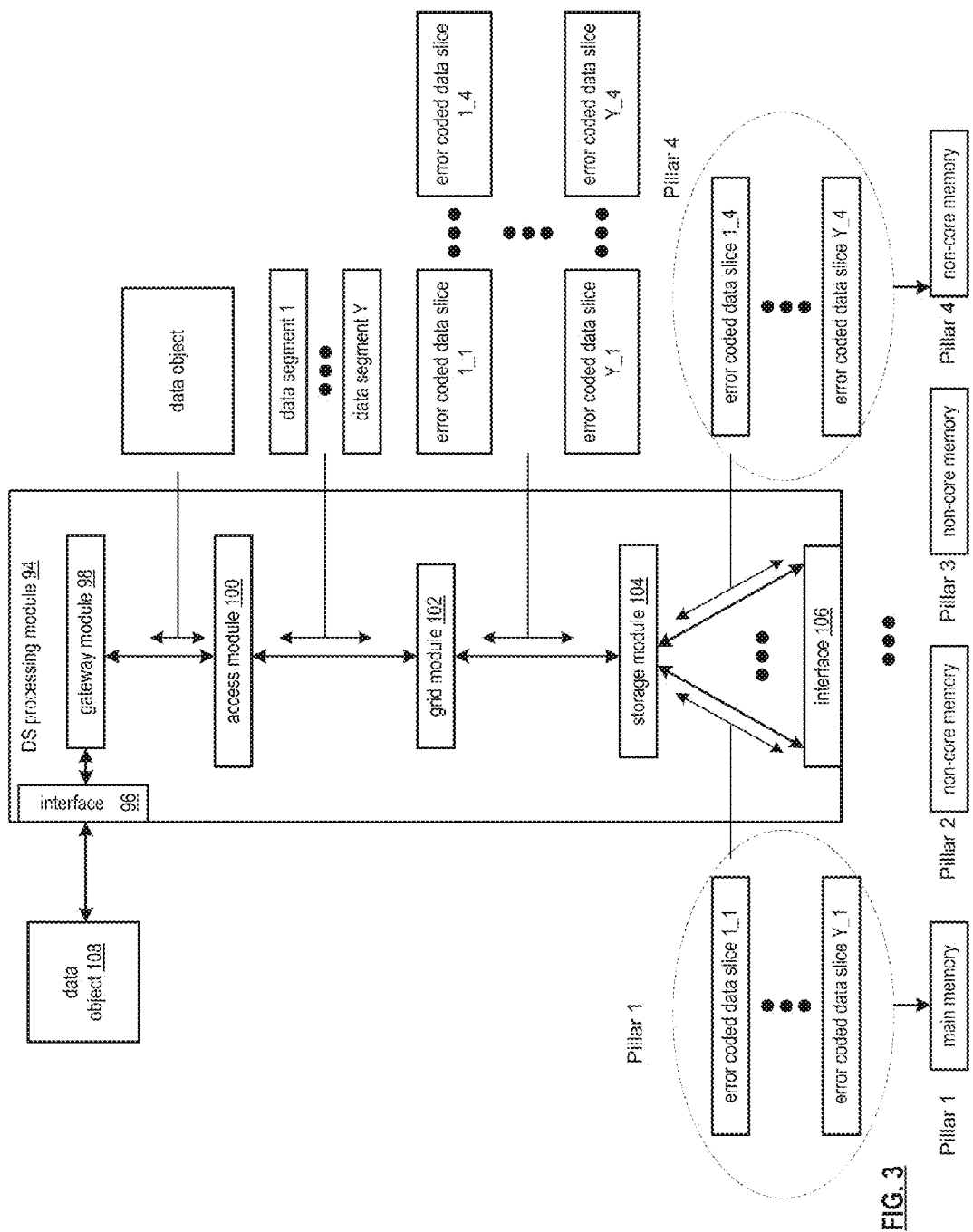
FIG. 3 is a schematic block diagram of an embodiment of a dispersed storage processing module in accordance with the invention.

FIG. 3 is a schematic block diagram of an embodiment of a dispersed storage (DS) processing module 94 of memory controller 60. The DS processing module 94 includes a gateway module 98, an access module 100, a grid module 102, a storage module 104, and may further include a bypass/feedback path (not shown) from the storage module to the access module. The DS processing module 94 may also include an interface 96 and a DS interface 106.

In an example of storing data, the gateway module 96 of the DS processing module 94 receives an incoming data object (e.g., a data file, a data block, an EC data slice, etc.), authenticates the component associated with the data object, obtains component information of the authenticated user, and assigns a source name to the data object in accordance with the component information. To authenticate a component, the gateway module 98 verifies a component ID (e.g., ID of the processing module, main memory, non-core memory, and/or the LAN-WAN memory). If the ID is verified, the gateway module 98 retrieves the component information, which includes a vault identifier, operational parameters, and component attributes. A vault identifier identifies a vault, which is a virtual memory space that maps to a set of memory devices (e.g., the main memory, the non-core memory, and/or the LAN-WAN memory). For example, a first vault may include eight non-core memory devices (X=8 wide) and a second vault may include sixteen LAN-WAN memory devices (X=16 wide). The operational parameters may include an error coding algorithm, the width n (number of pillars X or slices per segment for this vault), a read threshold T, an encryption algorithm, a slicing parameter, a compression algorithm, an integrity check method, caching settings, parallelism settings, and/or other parameters that may be used to access the DSN memory layer.

The gateway module 98 determines the source name to associate with the data object based on the vault identifier and the data object. For example, the source name may contain a data name (block number or a file number), the vault generation number, a reserved field, and a vault identifier. The data name may be randomly assigned but is associated with the user data object.

The gateway module 98 may utilize the bypass/feedback path to transfer an incoming EC data slice from one memory device to another when the DS processing module 94 determines that the EC data should be transferred without decoding. For example, EC data slices may be transferred from main memory to non-core memory and/or to WAN-LAN memory without decoding in accordance with the error coding dispersal function.

The access module 100 receives the data object and creates a series of data segments 1 through Y therefrom. The number of segments Y may be chosen or random based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the source name.

The grid module 102, as will be discussed in greater detail with reference to FIG. 6, may pre-manipulate (e.g., compression, encryption, cyclic redundancy check (CRC), etc.) the data segment before creating X error coded data slices for each data segment. The grid module 102 creates XY error coded data slices for the Y data segments of the data object and adds forward error correction bits to the data segment bits in accordance with an error coding algorithm (e.g., Reed-Solomon, Convolution encoding, Trellis encoding, etc.) to produce an encoded data segment. The grid module 102 determines the slice name and attaches the unique slice name to each EC data slice.

The number of pillars, or slices X per data segment (e.g., X=16) is chosen as a function of the error coding objectives. The DS processing module may utilize different error coding parameters for EC data slices based on guidance from one or more of vault parameters (e.g., a read threshold), a command from the processing module, priority of the EC data slice, type of data in the EC data slice, and/or retrieval speed requirements. Note that a read threshold T (e.g., T=10) of the error coding algorithm is the minimum number of error-free error coded data slices required to be able to reconstruct a data segment. For instance, the DS processing module 94 can compensate for X-T (e.g., 16–10=6) missing, out-of-date, and/or corrupted error coded data slices per data segment.

The grid module 100 receives each data segment 1-Y and, for each data segment, generates X number of error coded (EC) slices using an error coding dispersal function. The grid module 100 also determines the memory devices for storing the EC data slices based on a dispersed storage memory mapping associated with the memory device(s), associated with the component's vault, and/or memory device attributes, which include availability, self-selection, performance history, link speed, link latency, ownership, available DSN memory, domain, cost, a prioritization scheme, a centralized selection message from another source, a lookup table, data ownership, and/or any other factor to optimize the operation of the computing system. In this embodiment, the grid module 100 is designating main memory 64 for storing EC data slices of pillar 1, non-core memory device 84 for storing EC data slices of pillar 2, non-core memory 86 for storing EC data slices of pillar 3, and so on.

The storage module 104 may perform integrity checks on the EC data slices and then transmit the EC data slices 1 through X of each segment 1 through Y to the designated memory devices. The DS storage module 94 may store the EC data slices and locally keep a table to convert virtual DSN addresses into physical storage addresses. Note that the number of targeted memory devices is equal to or greater than the number of pillars (slices X per segment) so that no more than one error coded data slice of the same data segment is stored on the same memory device. Further note that EC data slices of the same pillar number but of different segments (e.g., EC data slice 1 of data segment 1 and EC data slice 1 of data segment 2) may be stored on the same or different memory devices.

In an example of a read operation, the DS processing module 94 receives a read request, which it authenticates. When the request is authentic, the DS processing 94 sends a read message to each of the memory devices (e.g., main memory and the non-core memories) storing slices of the data object being read. The slices are received by the storage module 104, which performs a parity check and provides the slices to the grid module 102. The grid module 102 de-slices and decodes the slices of a data segment to reconstruct the data segment. The access module 100 reconstructs the data object from the data segments and the gateway module 98 formats the data object for transmission to the processing module, peripheral device, I/O device, or other targeted component of the computer system.

Figure 4:
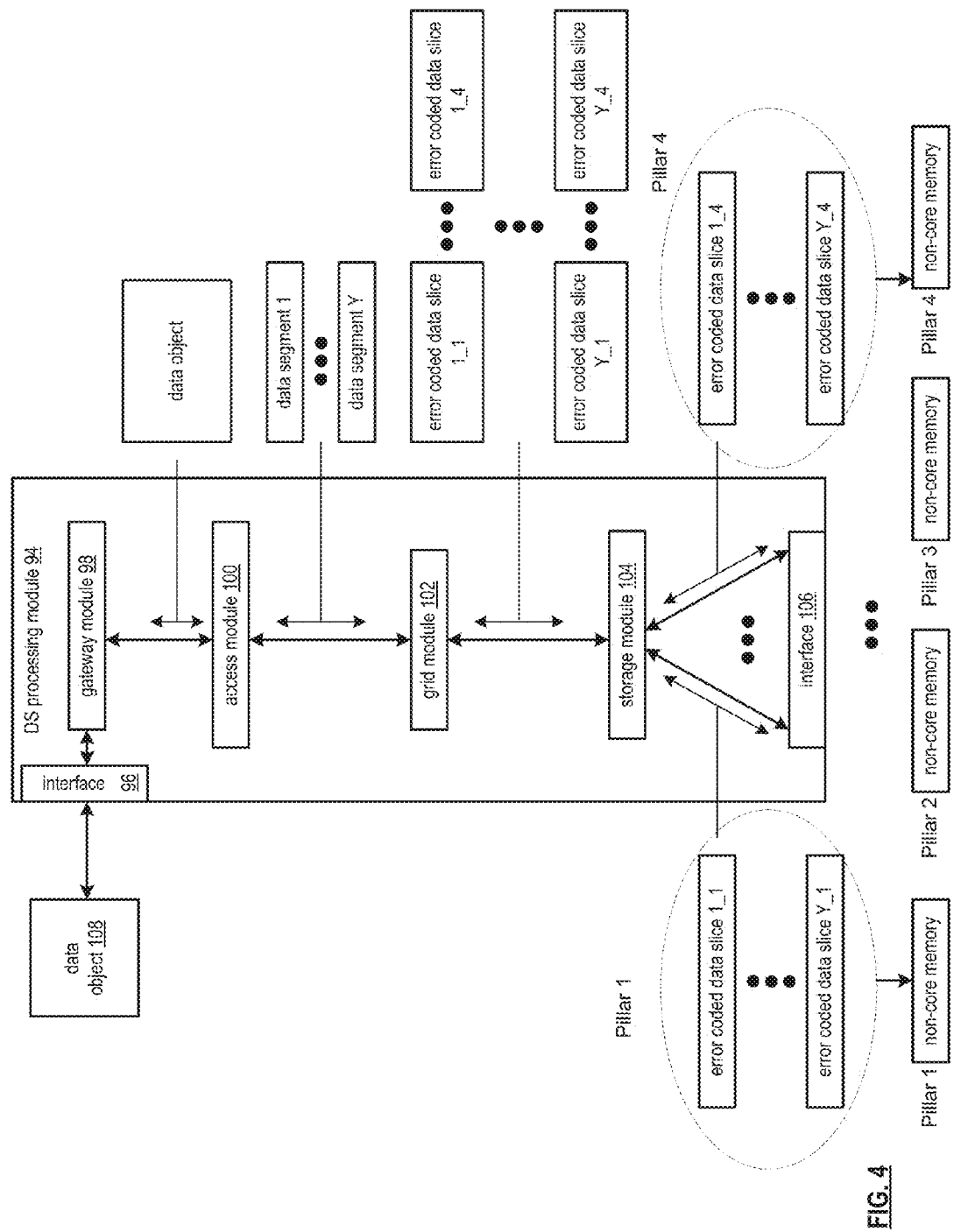
FIG. 4 is a schematic block diagram of another embodiment of a dispersed storage processing unit in accordance with the invention.

FIG. 4 is a schematic block diagram of an embodiment of a dispersed storage (DS) processing module 94 similar to that of FIG. 3. In this embodiment, the EC data slices are stored and retrieved from a plurality of non-core memory devices.

Figure 5:
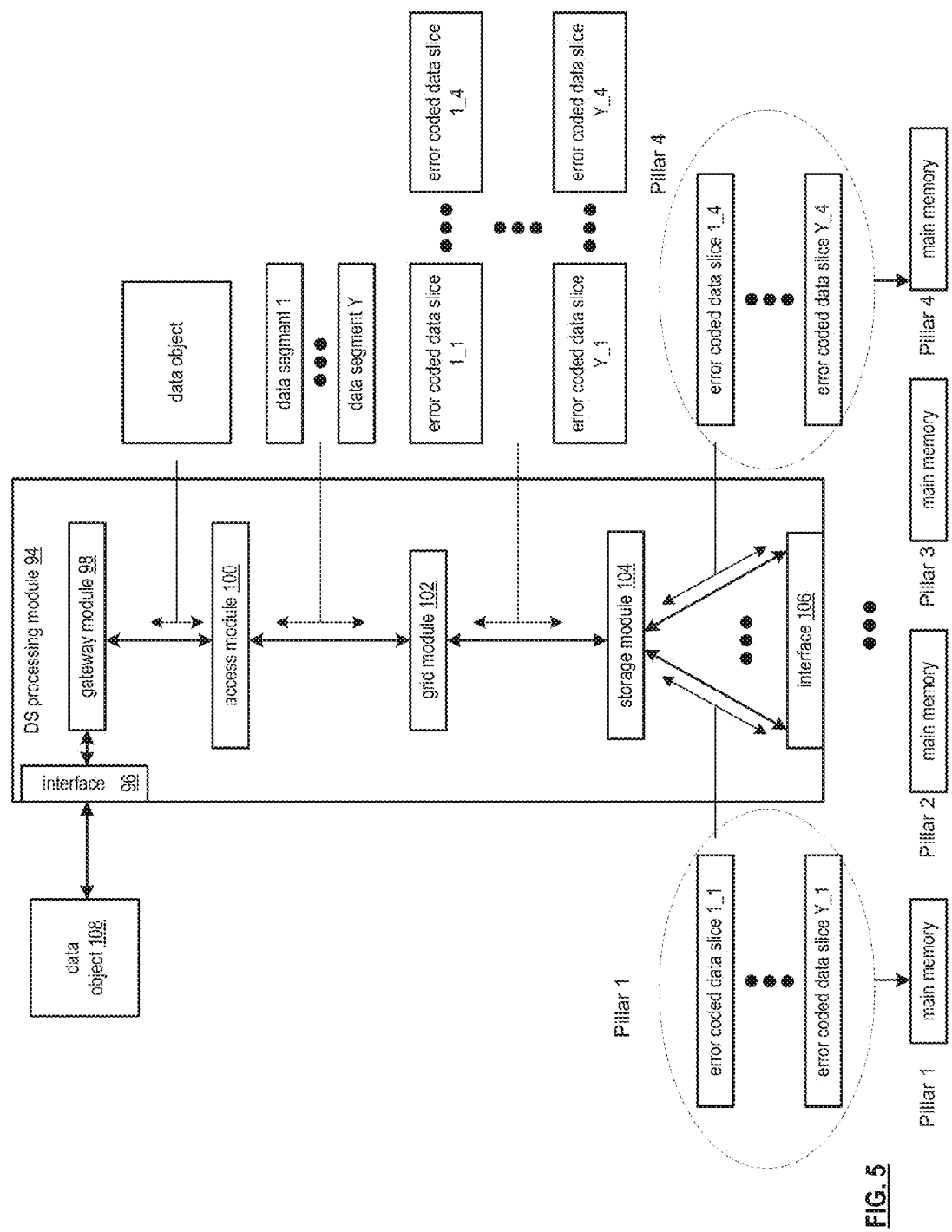
FIG. 5 is a schematic block diagram of another embodiment of a dispersed storage processing unit in accordance with the invention.

FIG. 5 is a schematic block diagram of an embodiment of a dispersed storage (DS) processing module 94 similar to that of FIG. 3. In this embodiment, the EC data slices are stored and retrieved from a plurality of memory devices of the main memory.

FIG. 6 is a schematic block diagram of an embodiment of a grid module 102 that includes a control unit 112, a pre-data manipulator 114, an encoder 116, a slicer 118, a post-data manipulator 120, a pre-data de-manipulator 122, a decoder 124, a de-slicer 126, and a post-data de-manipulator 128. Note that the control unit 112 may be partially or completely external to the grid module 102. For example, the control unit 112 may be part of the computing core, part of a user device, or in a system manager.

The control unit 112 may assist and/or control the other elements of the grid module 102 to determine operational parameters that may include the types of pre-data and post-data manipulation/de-manipulation are to be applied to an incoming/outgoing data segments 130, if any, the type of error encoding/decoding to apply to the (encoded) data segments 132, and the slicing/de-slicing function. In addition, the control unit 112 may further create and maintain a distributed storage memory mapping, status of the various memory device, performance history of the memory devices, capability of the memory devices, prioritization information for memory device usage, and rebuilding criteria (e.g., when to rebuild, when to gather integrity information, etc.). The control unit 112 may determine the operational parameters by combining parameters of the associated vault with other parameters, which will be discussed below.

In an example of operation, the pre-data manipulator 88 receives the data segment 104 and a write instruction from an authorized device (e.g., the processing module) or is generated by the memory controller. The control unit 112 or gateway module may assist the pre-data manipulator 114 to determine the vault for this data segment 130. When enabled, the pre-data manipulator 114 determines if pre-manipulation of the data segment 130 is required, and if so, what type of pre-manipulation. The determination may be based on one or more factors including a computing system-wide predetermination, a table lookup, vault parameters associated with the user identification, the type of data, security requirements, available DSN memory, performance requirements, and/or other metadata.

The pre-data manipulator 114 manipulates the data segment in accordance with the manipulation determination, which includes one or more of compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other manipulations to enhance the value of the data segment 104. Note that the pre-data de-manipulator 122 performs the complementary functions of the pre-data manipulator 114 when data is retrieved from the memory devices. Note that the pre-data manipulator 114 and pre-data de-manipulator 122 are bypassed when data is recovered and reconstructed in the rebuild path.

The encoder 116 receives the data segment 130 from the pre-data manipulator 114 and encodes the data segment using an error coding function (e.g., FEC, Reed-Solomon, etc.) to produce the encoded data segment 106. The encoder 116 determines what type of encoding algorithm to use based on factors including predetermination in the vault for the data segment 104, a time based algorithm, user directed, DS managing unit directed, as a function of the data type, as a function of the data segment metadata, and/or any other factor to determine algorithm type. The encoder may utilize a different encoding algorithm for each data segment, the same encoding algorithm for all data segments, or some other combination. The encoder may determine the encoding algorithm type to be one of Golay, Multidimensional parity, Reed-Solomon, Hamming, Bose Ray Chauduri Hocquenghem (BCH), Cauchy-Reed-Solomon, or any other FEC encoder. Note that the encoded data segment 132 is of greater size than the data segment 130 by the overhead rate of the encoding algorithm. For instance, the encoded data segment is d(X/T), where d is size of the data segment, X is the width n or number of slices, and T is the threshold or minimum number of received slices to enable recreation of the data segment.

The corresponding decoding process performed by decoder 124 can accurately recover the data segment provided it receives T or more slices. For example, if X=16 and T=10, then the data segment 130 will be recoverable even if 6 EC data slices per segment are corrupted or missing. Note that the decoder 124 performs the complementary functions of the encoder 124 when data is retrieved from the DSN memory.

The slicer 118 receives the encoded data segment 132 and transforms it into EC data slices in accordance with the slicing parameter from the vault for this requesting component and/or data segment. For example, data segments are packed one for one into a data slice. In this instance, it is possible to correct many data slices with this method if the error patterns are substantially manifested as individual bit errors. In another example, entire slices may be lost and hence entire data segments may not be recoverable. In another embodiment, a data segment is dispersed across many data slices (e.g., X wide pillars) to lessen the impact on a given data segment when an entire data slice is lost. Less data per segment is lost, when a data slice is lost, as the data segment is dispersed across more slices. The slicing is discussed in greater detail with reference to FIG. 5. Note that the de-slicer 100 performs the complementary functions of the slicer 92 when data is retrieved from the DSN memory.

The post-data manipulator 120 receives EC data slices and determines if post-manipulation of the EC data slices is required, and if so, what type of post-manipulation. The determination may be driven by one or more factors including a computing system-wide predetermination, parameters in the vault for this user, a table lookup, the user identification, the type of data, security requirements, available DSN memory, performance requirements, and/or other metadata. The post-data manipulator manipulates the EC data slice in accordance with the manipulation determination. The manipulation may include one or more of slice level compression, signatures, encryption, CRC, addressing, watermarking, tagging, adding metadata, and/or other manipulation to improve the effectiveness of the computing system. The post-data manipulator passes the resulting EC data slices, with the attached slice name, to the storage module for storage in the DSN memory. Note that the post-data de-manipulator 126 performs the complementary functions of the post-data manipulator 120 when data is retrieved from the memory devices.

In an example of operation, the grid module 110 performs a rebuilder operation to repair a particular data segment that has known missing, out-dated, and/or corrupted EC data slices. When one or more slices of a data segment are to be rebuilt, the grid module retrieves at least T EC data slices (e.g., T=read threshold) of slices of the data segment that do not have a data inconsistency. In addition, the grid module may retrieve vault parameters based on a vault identifier contained in the slice name, wherein the vault parameters include information regarding the type of post-data manipulation, the slicing/de-slicing function, and the encoding/decoding function. Based on these parameters, the retrieved slices are post-data de-manipulated, de-sliced, and decoded to produce a reconstructed data segment. The reconstructed data segment is then encoded, sliced, and post-data manipulated to produce a plurality of rebuilt data slices that are sent to the memory devices for storage.

FIG. 7 is a diagram of an example embodiment of error coded data slice creation where the slicer creates four EC data slices from a thirty-two bit encoded data segment. The slicer disperses the bits from the encoded data segment across the EC data slices wrapping around from the last slice to the first slice over and over (i.e., interleaves the bits among the slices). Each EC data slice, for this data segment, is stored on a different DS storage unit. In this example, encoded data segment bits 0, 4, 8, 12, 16, 20, 24, and 28 form EC data slice 1; encoded data segment bits 1, 5, 9, 13, 17, 25, and 29 form EC data slice 2; encoded data segment bits 2, 6, 10, 14, 18, 22, 26, and 30 form EC data slice 3; and encoded data segment bits 3, 7, 11, 15, 19, 23, 27, and 31 form EC data slice 4. In a 4/3 system (a width of 4 pillars and a read threshold of 3), one EC data slice can be lost and the data segment can still be accurately recovered. Note that more slices produce a larger distance between consecutive encoded data segment bits of a slice, which improves the error resiliency.

Figure 8:
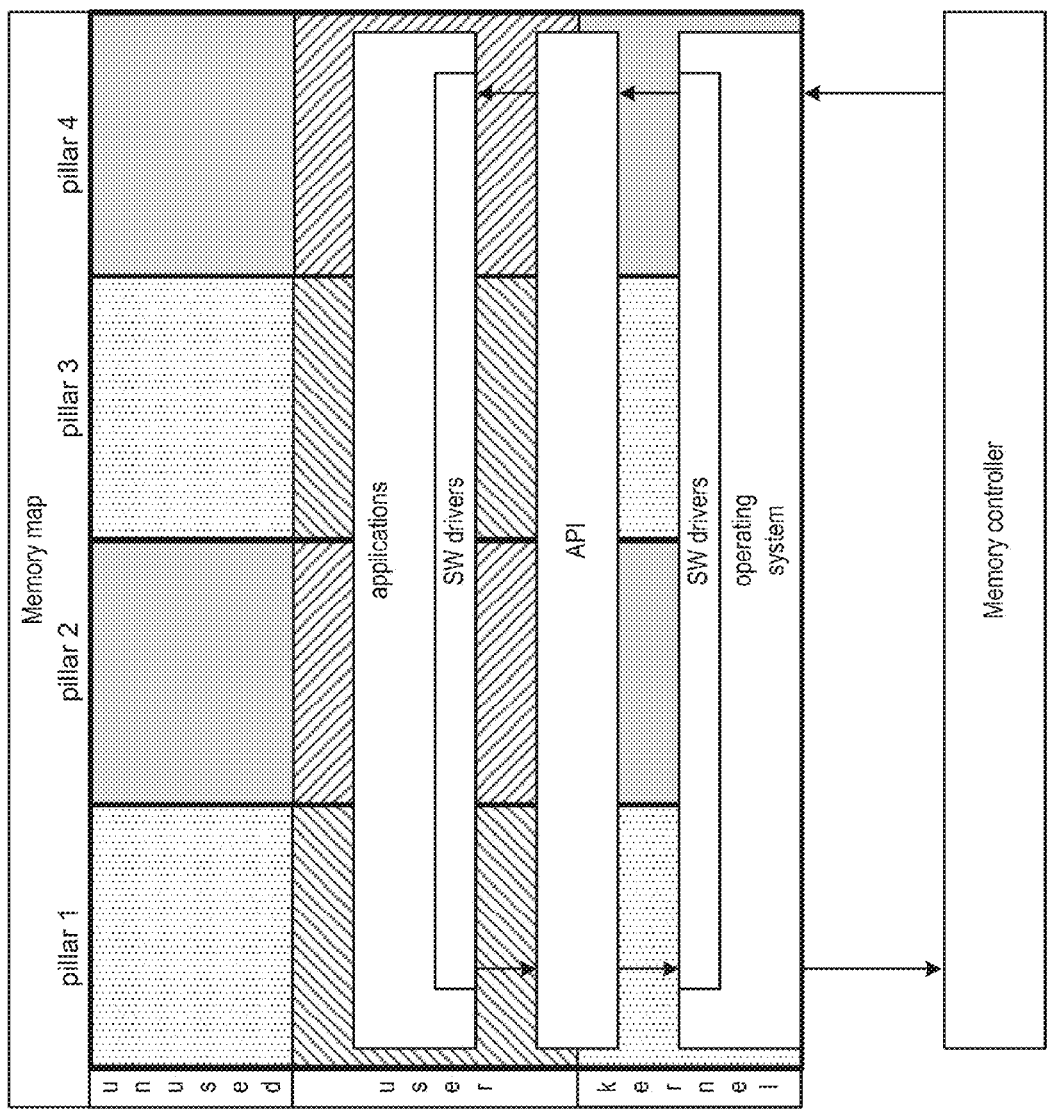
FIG. 8 is a schematic block diagram of an embodiment of a memory mapping in accordance with the invention.

FIG. 8 is a schematic block diagram of an embodiment of a computer system's a memory map that includes a kernel block, a user block, and an unused block. The blocks may be associated with physical memory addresses or the blocks may be associated with virtual memory where the physical memory may be fragmented within a first memory type (e.g., core memory) or overflow to a second memory type (e.g., non-core memory). The kernel block is an area of memory exclusive to the operating system (OS). The user block is typically used to store applications (e.g., instructions and/or data of an application). The unused block is spare memory in an instantaneous sense as it may be used for future expansion of more applications and for other uses on a temporary basis (e.g., data caching).

In this example, the memory is divided into a four pillar DSN (dispersed storage network) memory set, where first EC data slices of data segments are stored in pillar 1, second EC data slices of the data segments are stored in pillar 2, and so on. Alternatively, a data object may be stored as raw data (i.e., not dispersed error coded) in one to all four of the pillars. Each pillar may be the same memory type (e.g., all main memory), or the pillars may include different memory types (e.g., one core, a second non-core, a third LAN memory, and a fourth WAN memory). Note that a computing system may include one or more DSN memory sets and each may have a different number of pillars. For example, the kernel may utilize a first DSN memory set and the applications may utilize a second DSN memory set. As such, the operating system may be stored as a series of EC data slices and/or as raw data in the kernel section; software drivers may be stored as a series of EC data slices and/or raw data in the kernel section or in the user section; applications may be stored as a series of EC data slices and/or raw data in the user section; and the API may be stored as a series of EC data slices and/or as raw data in the kernel section and/or the user section.

Figure 9:
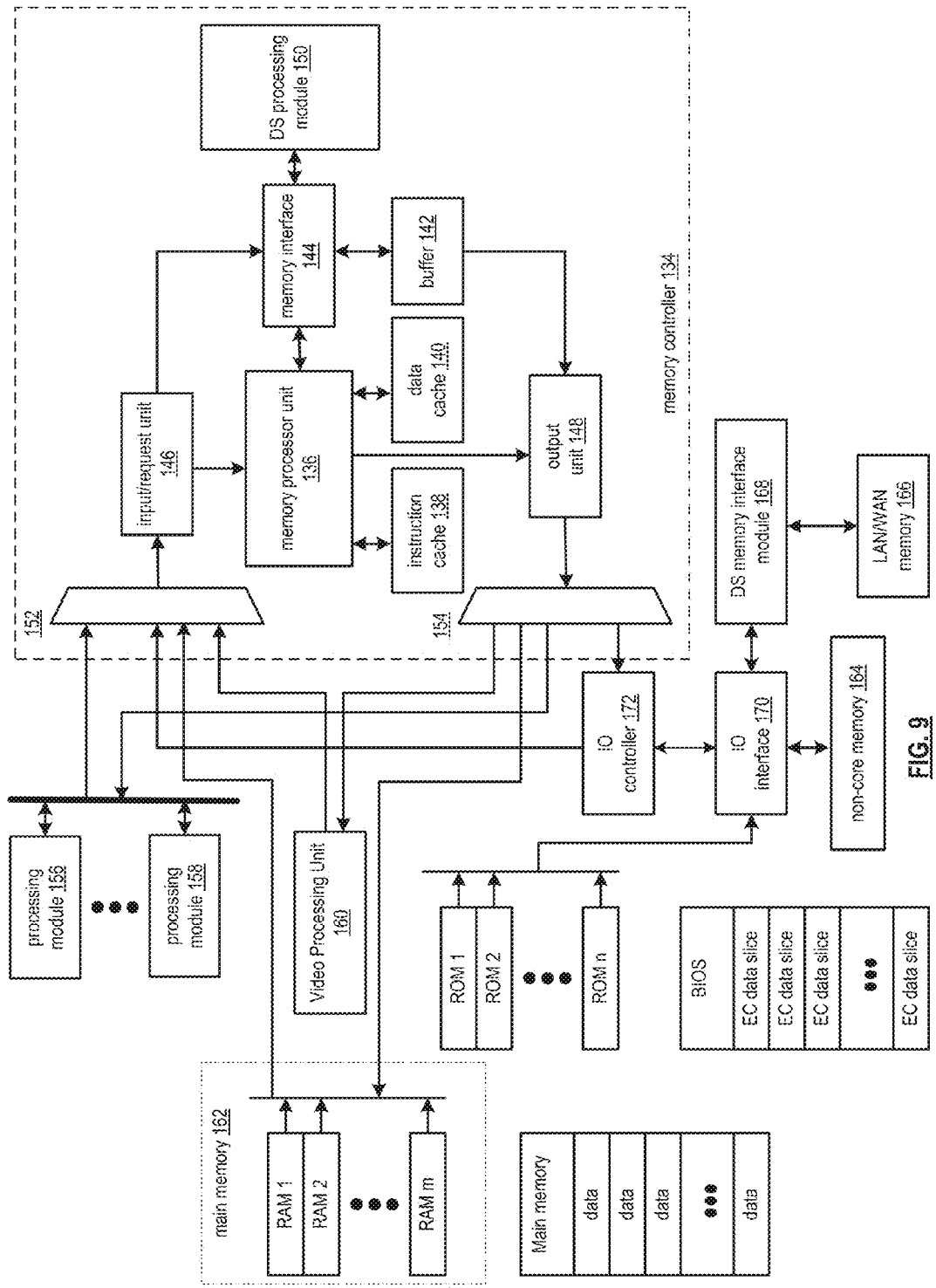
FIG. 9 is a schematic block diagram of an embodiment of a memory controller in accordance with the invention.

FIG. 9 is a schematic block diagram of another embodiment of the computing core coupled to one or more non-core memories 164 and/or to one or more LAN/WAN memories 166. The computing core includes one or more processing modules 156-158, main memory 162, a memory controller 134, a video processing unit 160, a plurality of ROM, an IO controller 172, and IO interface, 170, and a DS memory interface module 168. The memory controller 134 includes a memory processor unit 136, an instruction cache 138, a data cache 140, a memory interface 144, a buffer 142, an input/request unit 146, an output unit 148, multiplexers 152-154, and the DS processing module 150.

The main memory 162 includes a plurality of random access memory (RAM) and may store data in a raw format (e.g., not EC data slices) or in an error coding dispersal format (e.g., as EC data slices). The data stored in main memory 162 may be BIOS instructions, OS instructions, application instructions, application configuration data, and/or application operational data.

The plurality of ROM stores at least a portion of the BIOS program. The instructions of the BIOS program may be stored in the raw format (e.g., not EC data slices) or in the error coding dispersal format.

The non-core memory 164, and LAN/WAN memory 166 may connect to the memory controller 134 via the IO controller 172 and IO interface 170. The LAN/WAN memory 166 may interface with the IO interface 170 via a dispersed storage (DS) memory interface module 168. The non-core memory 164, and LAN/WAN memory 166 may store data information in the raw format (e.g., not EC data slices) or in the error coding dispersal format.

In general, the memory controller 134 fetches executable instructions for one or more processing modules 156-158, transfers data between the components of the computing system (e.g., the processing module, the peripheral devices, the video processing unit 160, the main memory 162, the ROM, the non-core memory 164, and the LAN/WAN memory 166), and facilitates reading and writing of data in memory. As part of the fetching of instructions and as part of the reading and writing of data, the memory controller 134 determines whether the instructions and/or data is:

- is encoded in accordance with an error coding dispersal function and is to be decoded;
- is encoded in accordance with the error coding dispersal function and is to remain encoded;
- is encoded in accordance with the error coding dispersal function and is to be encoded in accordance with a different error coding dispersal function;
- is in the raw data format and to be encoded in accordance with the error coding dispersal function; and/or
- is in the raw data format and to remain in the raw data format.

In an example of operation, the processing module 156-158 sends a request to fetch BIOS instructions to the input/request unit 146. The memory processor unit 136 determines where the BIOS instructions are located by accessing a DSN data to physical memory lookup table. The memory processor unit 136 issues a command to the output unit 148 to send read commands to the ROM to retrieve EC data slices. The input/request unit 146 receives EC data slices from the ROM and sends them to the DS processing module 150 via the memory interface 144. The memory processor unit 136 temporarily holds the EC data slices in one or more of the data cache 140 or buffer 142 if the DS processing module 150 is not available to receive the EC data slices. When the DS processing module 150 is available, it receives the EC data slices and converts them into raw BIOS instructions and sends the BIOS instructions to the output unit 148 via the buffer 142.

The memory processor unit 136 directs the output unit 148 to output the raw BIOS executable instructions for storage in one or more of the main memory 162, the non-core memory 164, and/or the LAN/WAN memory 166. Once the BIOS instructions are stored, the memory controller unit 134 fetches them and transfers them to the processing module 156-158. Alternatively, the raw BIOS instructions may be directly outputted to the processing module 156-158.

In another example of operation, the processing module 156-158 instructs the memory controller 134 to save an application data result. The memory processor unit 136 determines where to store the application data result and in what format by based on information in the memory map. The memory processor unit 136 then issues a command to the output unit 148 to send read commands to the main memory 162 to retrieve application data result. The input/request unit 146 receives the application data result from the main memory 162 and sends it to the DS processing module 150 via the memory interface 144 when it is to be error encoded. The memory processor unit 136 temporarily stores the application data result in the buffer until DS processing module 150 is available to convert the application data result into EC data slices.

The memory processor unit 136 then directs the output unit 148 to store the EC data slices from the buffer 142 in one or more of the main memory 162, the non-core memory 164, and/or the LAN/WAN memory 166 based on the DSN data to physical memory lookup table.

In another example of operation, the processing module 156-158 sends a request to transfer a data object (in EC data slices in the DSN) from one DSN memory to another. The memory processor unit 136 determines where the data object EC slices are located by accessing the DSN data to physical memory lookup table. The memory processor unit 136 issues a command to the output unit 148 to send read commands to the WAN memory 166. The input/request unit 146 receives EC data slices from the WAN memory 166 and sends them to the DS processing module 150 via the memory interface 144. The DS processing module 150 converts the EC data slices into destination EC data slices using another error coding dispersal function and sends the destination EC data slices to the output unit 148 via the buffer 142.

The memory processor unit 136 directs the output unit 148 to store the destination EC data slices from the buffer 142 in one or more of the main memory 162, the non-core memory 164, and/or the LAN/WAN memory 166 based on the DSN data to physical memory lookup table.

In another example, the input/request unit 146 receives the memory access request and forwards it to the memory processor unit. The memory processor unit interprets the memory access requests to determine whether an error coding dispersal function is to be applied to a data segment to produce an error coded processed data segment (e.g., encode and slice a data segment to produce EC data slices), the error coding dispersal function is to be applied to an error coded processed data segment to reconstruct the data segment (e.g., de-slice and decode EC data slices to produce the data segment), the error coding dispersal function is not to be applied to the data segment (e.g., transferring a data segment in a non-distributed format), or if the error coding dispersal function is not to be applied to the error coded processed data segment (e.g., transferring EC data slices). The determination may be based on one or more of but not limited to information in the memory access request, an object ID, a filename, a virtual memory address, a user ID, the process ID, a vault ID, a vault lookup, a predetermination, a list, a command, and/or a message.

The memory processor unit determines a destination of the data segment or of the error coded processed data segment, wherein the destination is one of the distributed storage processing module, the memory interface, the temporary memory, and the output unit. The determination may be based on one or more of but not limited to information in the memory access request, a virtual memory addresses to physical memory address table lookup, an object ID, a filename, a virtual memory address, a user ID, the process ID, a vault ID, a vault lookup, a predetermination, a list, a command, and/or a message.

The memory processor unit generates a data routing signal based on the interpreting of the memory access request (e.g., how to route). The input/request unit forwards the data segment or the error coded processed data segment associated with the memory access request to the destination in accordance with the data routing signal.

In another example, the memory controller 134 includes the DS processing module 150 and a memory control processing module. The memory control processing module may include one or more of the multiplexers 152-154, the input/request unit 146, the memory processor unit 136, the memory interface 144, the instruction cache 138, the data cache 140, the buffer 142, and/or the output unit 148.

In an example of operation, the memory control processing module receives a memory access request regarding a data segment. The DS processing module may interpret the memory access request to determine vault information facilitates storage of the vault information. The vault information may include one or more of but not limited to a virtual memory address to distributed physical address table, an object ID, a filename, the user ID, a vault ID, and/or operational parameters (e.g., pillar width, read threshold, write threshold, encoding method, slicing method, etc.).

The example continues, in a write scenario, with the memory control processing module receiving a write command of the data segment as the memory access request. In a read scenario, the memory control processing module receives a read command of the data segment as the memory access request. Note that the data segment may be stored in a memory of the computing system as EC data slices and/or in a non-distributed fashion (e.g., not as EC data slices). The memory control processing module interprets the memory access request to determine whether an error coding dispersal function of the data segment is applicable. In other words, the memory control processing module determines if the data segment is stored as EC data slices.

The memory control processing module converts a virtual memory address of the data segment to a non-distributed physical address when the error coding dispersal function is not applicable. In other words, the memory control processing module determines physical memory addresses when the data segment is not stored as EC data slices. In a write scenario, the memory control processing module interprets the write command to determine that the data segment is to be stored as a plurality of data slices in accordance with the error coding dispersal function. In a read scenario, the memory control processing module interprets the read command to determine that the data segment is stored as the plurality of data slices in accordance with the error coding dispersal function. In the read scenario, the memory control processing module addresses a plurality of memories to retrieve the plurality of data slices to send to the distributed storage processing module.

The example continues with the memory control processing module sending the memory access request to the distributed storage processing module when the memory control processing module determines that the error coding dispersal function is applicable. In other words, the memory control processing module activates the DS processing module when the data segment is stored as EC data slices. The distributed storage processing module converts the virtual memory address of the data segment to a plurality of distributed physical addresses when the error coding dispersal function is applicable. For instance, the distributed storage processing module determines physical memory addresses where the EC data slices are stored where the determination may be based on one or more of but not limited to the virtual memory address to distributed physical address table, a table lookup, information in the memory access request, an object ID, a filename, a virtual memory address, a user ID, a process ID, a vault ID, a vault lookup, a predetermination, a list, a command, and/or a message.

The example continues with the distributed storage processing module performing the error coding dispersal function on the data segment to produce an error coded processed data segment. In a write scenario, the distributed storage processing module performs the error coding dispersal function on the data segment to produce the plurality of data slices as the error coded processed data segment in accordance with operational parameters (e.g., pillar width, read threshold, encoding method, slicing method, etc.). In a read scenario, the distributed storage processing module performs the error coding dispersal function on the plurality of data slices to produce a reconstructed data segment as the error coded processed data segment in accordance with the operational parameters.

The example continues with the distributed storage processing modules sending the error coded processed data segment to the memory control processing module. In a write scenario, the memory control processing module addresses a plurality of memories to store the plurality of data slices. In a read scenario, the memory control processing module may send the reconstructed data segment to another module or unit of the computing system. Note that the method of the embodiment discussed above may repeat for a plurality of data segments, wherein a data object comprises a plurality of data segments.

Figure 10:
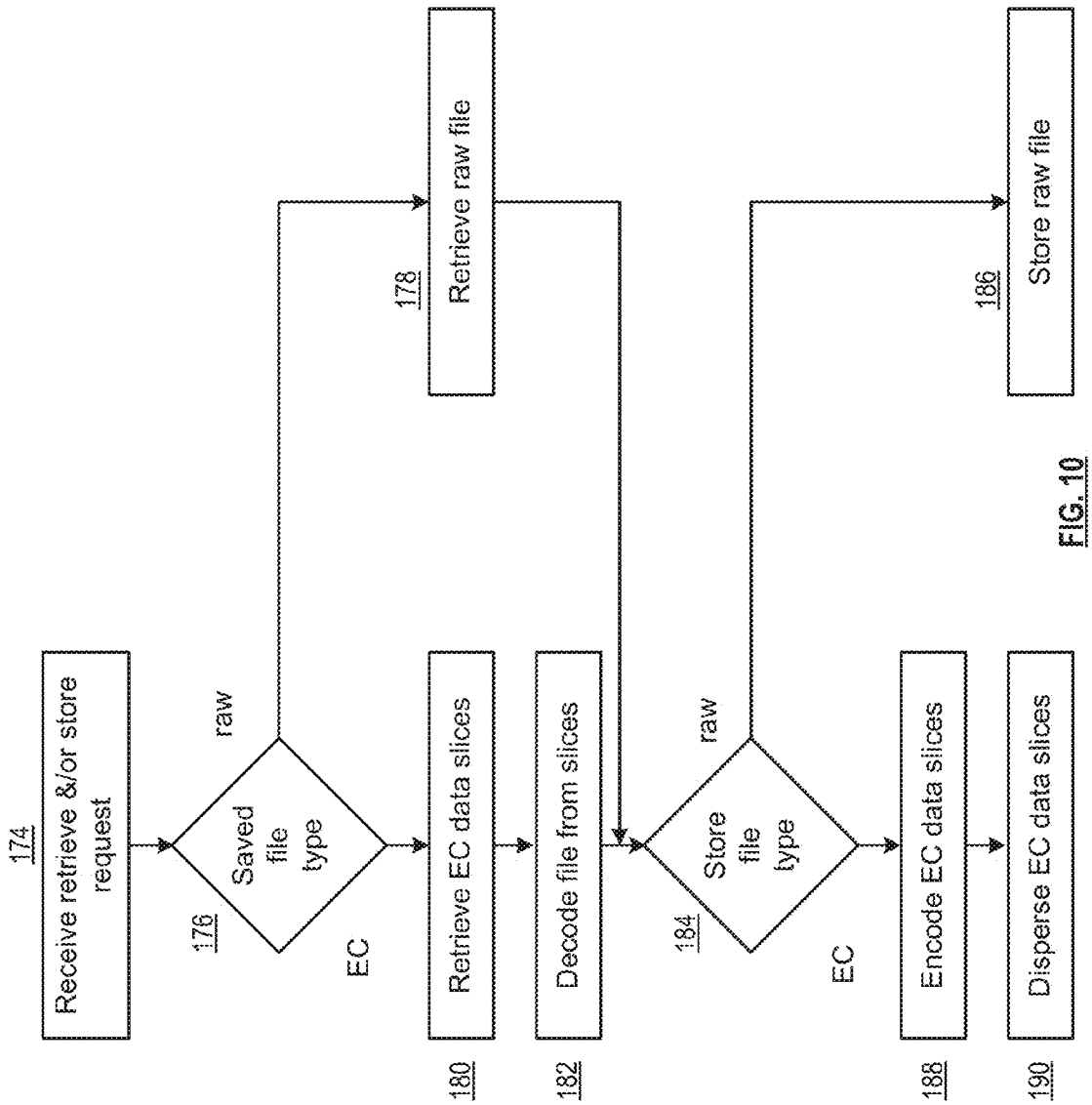
FIG. 10 is a logic diagram of an embodiment of a method for data handling in accordance with the present invention.

FIG. 10 is a logic diagram of an embodiment of a method for data handling where the memory controller transfers data from one memory to another. The memory controller may receive a retrieve and/or store request from the processing module 174. The memory controller may determine a saved file type based on vault parameters and the DSN data to physical memory lookup table 176. The memory controller may retrieve the raw format file or data object when the saved file type is raw 178.

The memory controller may retrieve the EC data slices format when the type is EC data slices 180. The memory controller may decode the EC data slices into the raw format data object 182.

The memory controller may determine a store file type based on vault parameters and the DSN data to physical memory lookup table 184. The store file type and store DSN memory level may be different than the saved file type and saved DSN memory level to realize a different set of resiliency and performance characteristics. For example, a dormant file that is in WAN memory may be error coded and dispersed to provide good protection. The dormant file may be required to operate in main memory with more speed of successive access steps. The memory controller may store the raw format file or data object when the store file type is raw 186.

The memory controller may encode raw format data object as EC data slices format when the store file type is EC data slices 188. The memory controller may disperse the EC data slices by storing the EC data slices in the DSN memory based on the DSN data to physical memory lookup table 190.

In an embodiment, the memory controller includes an interface for coupling to at least a memory device and a processing module operably coupled to the interface. The memory device may be implemented in a plurality of memory layers where the memory layers may include the main memory, a local non-core memory, a local area network memory, and/or a wide area network memory. For example, a first layer may include main memory associated with the computing core, a second layer may include local non-core memory such as a hard disk drive operably coupled to the computing core, a third layer may include local area network memory such as non-core memory operably coupled via a local area network (e.g., a hard disk drive in another computing device in the same building), and a fourth layer may include wide area network memory such as non-core memory operably coupled via a wide area network (e.g., a hard disk drive in another computing device that is not in the same building). Note that any of the layers may be associated with any memory type.

In an example of operation, the processing module receives a data segment memory transfer request from a first memory layer to a second memory layer. The processing module may interpret a read request or interpret a write request based on the data segment memory transfer request. For example, the data segment memory transfer request may include a read request from the main memory (e.g., the first memory layer) and a write request to the local area network memory (e.g., the second memory layer).

The processing module determines whether the data segment is stored within the first memory layer in accordance with an error coding dispersal function. The determination may be based on one or more of but not limited to information in the data segment memory transfer request, an object ID, a filename, a virtual memory address, a virtual memory address to distributed physical address table, a table lookup, a user ID, a process ID, a vault ID, a vault lookup, a predetermination, a list, a command, and/or a message.

The processing module retrieves the data segment from the first memory layer and determines whether to store the data segment in accordance with a second error coding dispersal function in the second memory layer when the processing module determines that the data segment is not stored in accordance with the error coding dispersal function (e.g., non-distributed). The determination may be based on one or more of but not limited to information in the data segment memory transfer request, an object ID, a filename, a virtual memory address, a virtual memory address to distributed physical address table, a table lookup, a user ID, a process ID, a vault ID, a vault lookup, a predetermination, a list, a command, and/or a message.

The processing module performs the second error coding dispersal function on the data segment to produce a second plurality of data slices and the processing module sends the second plurality of data slices to the second memory layer when the data segment is to be stored in accordance with the second error coding dispersal function. The processing module sends the data segment to the second memory layer when the data segment is not to be stored in accordance with the second error coding dispersal function (e.g., the non-distributed format data segment is transferred as a non-distributed format data segment).

The processing module determines whether the data segment is to be stored in the second memory layer in accordance with the error coding dispersal function when the processing module determines that the data segment is stored (e.g., in the first memory layer) in accordance with the error coding dispersal function. The processing module retrieves a plurality of data slices from the first memory layer, may utilize a buffer to temporarily store the plurality of data slices, converts the plurality of data slices into a reconstructed data segment, and determines whether to store the reconstructed data segment in accordance with the second error coding dispersal function in the second memory layer when the processing module determines that the data segment is not to be stored in the second memory layer in accordance with the error coding dispersal function. The determination may be based on one or more of but not limited to information in the data segment memory transfer request, an object ID, a filename, a virtual memory address, a virtual memory address to distributed physical address table, a table lookup, a user ID, a process ID, a vault ID, a vault lookup, a predetermination, a list, a command, and/or a message.

The processing module performs the second error coding dispersal function on the reconstructed data segment to produce the second plurality of data slices and sends the second plurality of data slices to the second memory layer when the reconstructed data segment is to be stored in accordance with the second error coding dispersal function. The processing module facilitates forwarding of the plurality of data slices from the first memory layer to the second memory layer when the processing module determines that the data segment is to be stored in the second memory layer in accordance with the error coding dispersal function. In other words, the processing module transfers the slices directly from the first memory layer to the second memory layer since they are both substantially utilizing the same error coding dispersal function.

Figure 11:
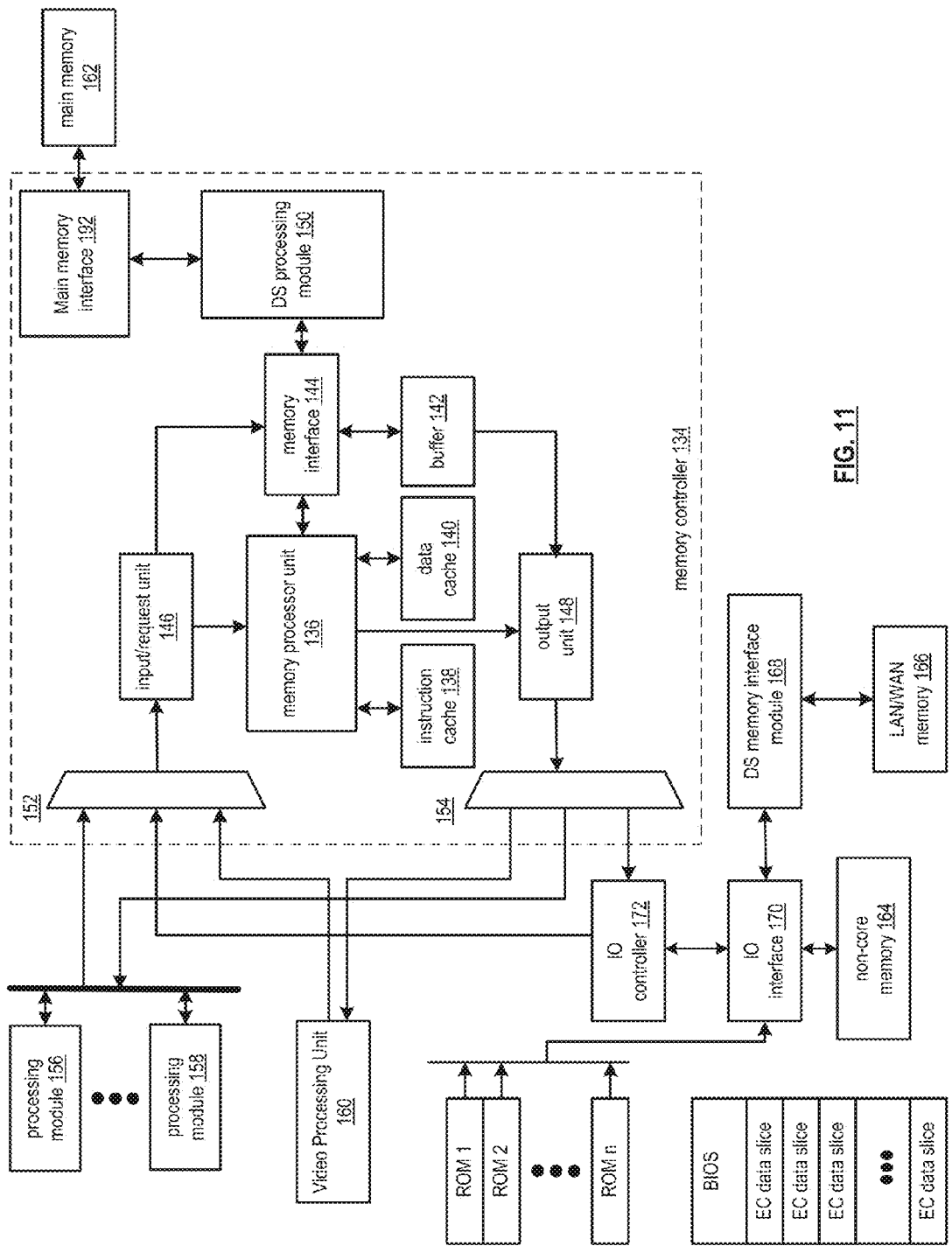
FIG. 11 is a schematic block diagram of another embodiment of a memory controller in accordance with the invention.

FIG. 11 is a schematic block diagram of another embodiment of the computing core coupled to one or more non-core memories 164 and/or to one or more LAN/WAN memories 166. The computing core includes one or more processing modules 156-158, main memory 162, a memory controller 134, a video processing unit 160, a plurality of ROM, an IO controller 172, and IO interface, 170, and a DS memory interface module 168. The memory controller 134 includes a memory processor unit 136, an instruction cache 138, a data cache 140, a memory interface 144, a buffer 142, an input/request unit 146, an output unit 148, multiplexers 152-154, a main memory interface 192, and the DS processing module 150.

This embodiment of the computing system is similar in construct and function as the computing system of FIG. 9, except that the main memory 162 is coupled to the memory controller 134 via the main memory interface 192, which is coupled to the DS processing module 150. As such, the DS processing module processes instructions and/or data written to, or read from the main memory 162. As such, the instructions and/or data stored in the main memory are done so in an error encoded manner (i.e., as EC data slices). When a processing module requests an instruction or data from the main memory via the memory controller, the DS processing module 150 converts the EC data slices of the instruction or data into a raw format of the instruction or data. Similarly, when the processing module desires to store an instruction or data in the main memory, the DS processing module 150 converts it from the raw format into the error-coded format.

Figure 12:
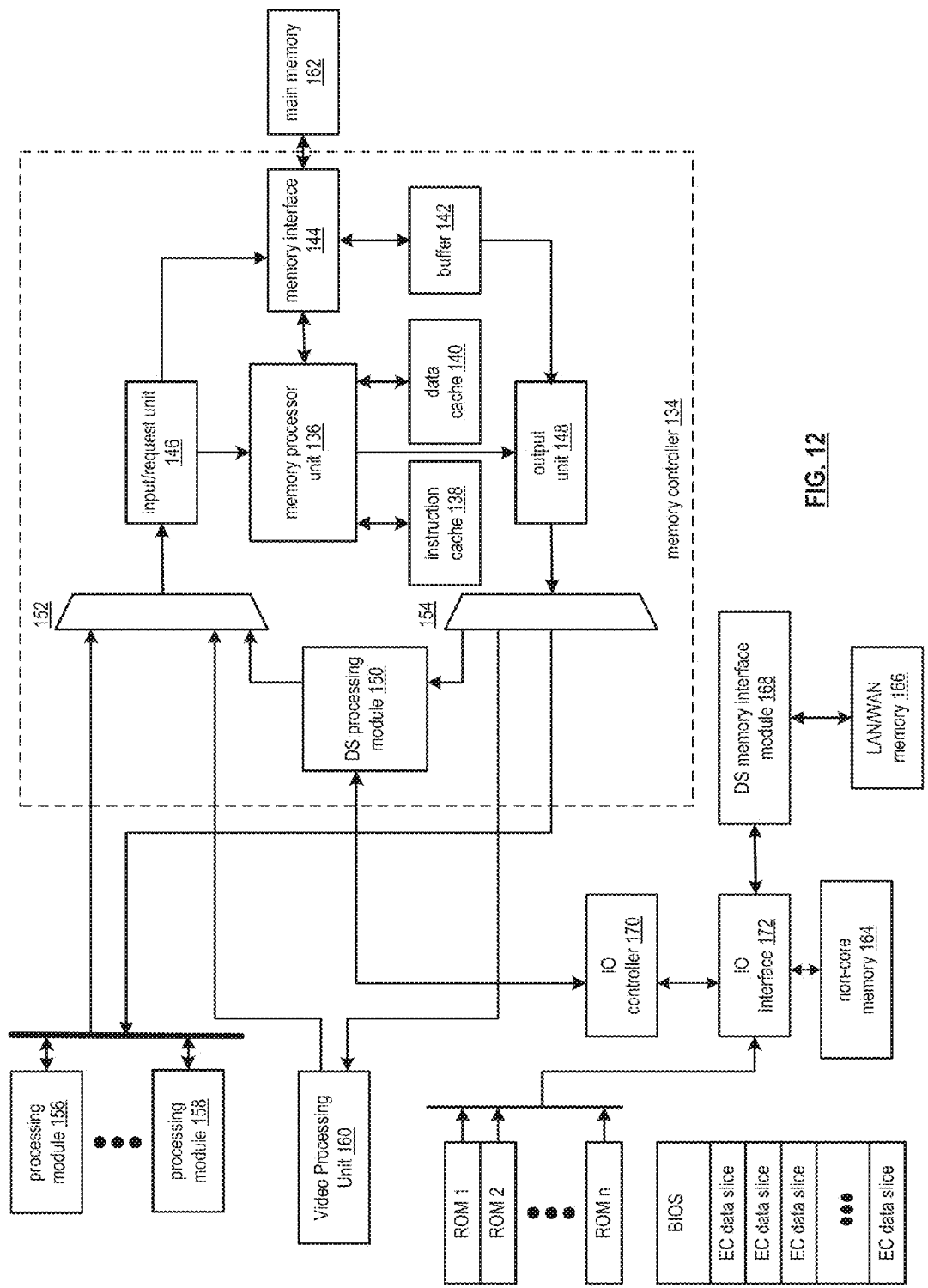
FIG. 12 is a schematic block diagram of another embodiment of a memory controller in accordance with the invention.

FIG. 12 is a schematic block diagram of another embodiment of the computing core coupled to one or more non-core memories 164 and/or to one or more LAN/WAN memories 166. The computing core includes one or more processing modules 156-158, main memory 162, a memory controller 134, a video processing unit 160, a plurality of ROM, an IO controller 172, and IO interface, 170, and a DS memory interface module 168. The memory controller 134 includes a memory processor unit 136, an instruction cache 138, a data cache 140, a memory interface 144, a buffer 142, an input/request unit 146, an output unit 148, multiplexers 152-154, a main memory interface 192, and the DS processing module 150.

This embodiment of the computing system is similar in construct and function as the computing system of FIG. 9, except that the DS processing module 150 is coupled to the input multiplexer 152 and the output multiplexer 154. In this embodiment, instruction and data written to and read from the main memory are done in a raw format and instructions and data written to and read from the non-core memory and/or the LAN/WAN memory is done in an error-coded format. As such, instructions and/or data retrieved from the non-core memory and/or the LAN/WAN memory is decoded into the raw format prior to processing by the other elements of the memory controller. In addition, instructions and/or data to be written to the non-core memory and/or the LAN/WAN memory is encoded into EC data slices by the DS processing module after the other elements of the memory controller have done their respective processing.

Figure 13:
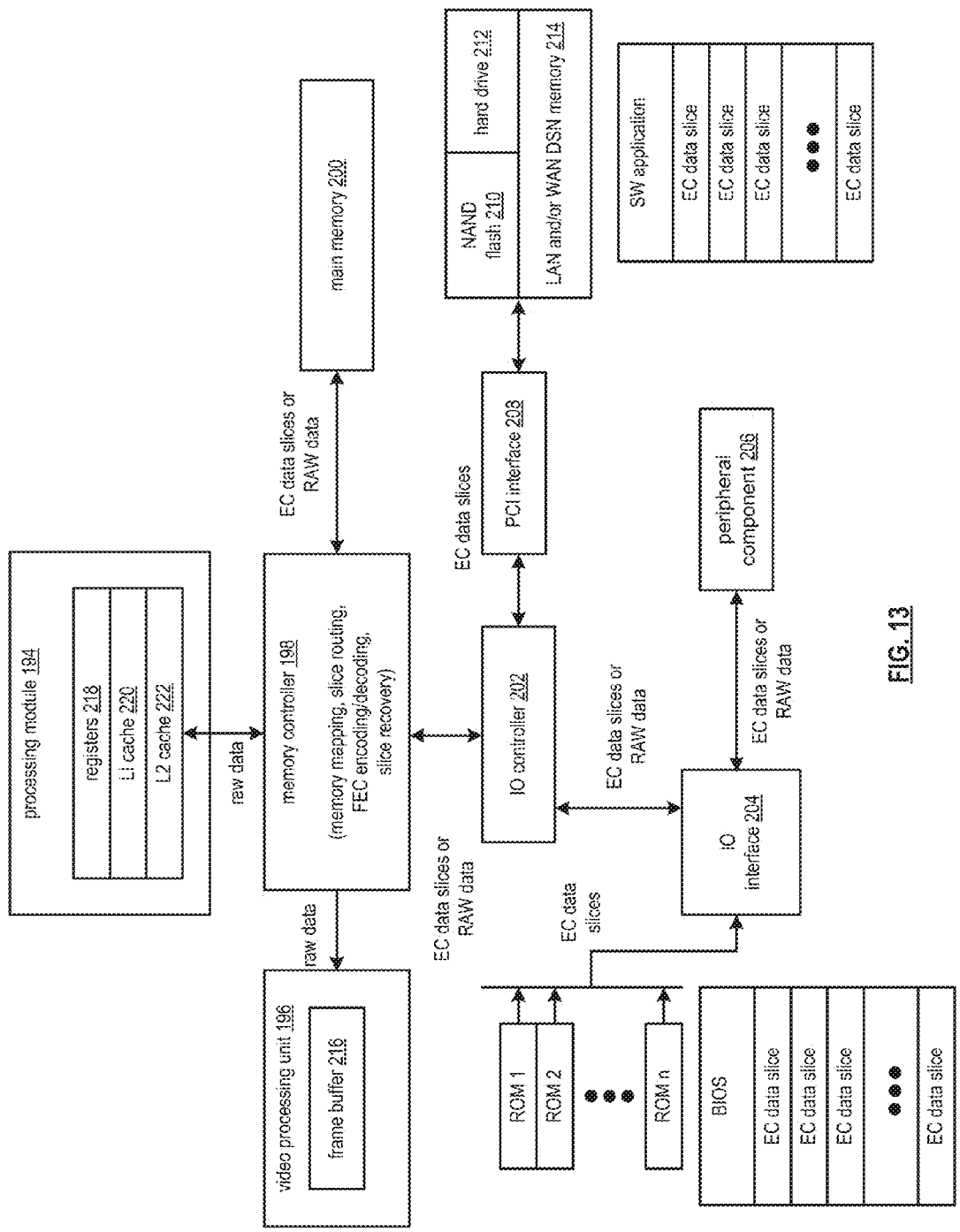
FIG. 13 is a schematic block diagram of another embodiment of a computing core in accordance with the invention.

FIG. 13 is a schematic block diagram of another embodiment of a computing core including the processing module 194, the video processing unit 196, the memory controller 198, the main memory 200, the IO controller 202, the IO interface 204, the peripheral component 206, the plurality of ROMs, the PCI interface 208, a NAND Flash 210, a hard drive 212, and the LAN and/or WAN DSN memory 214. The video processing unit 196 may include a frame buffer 216 to temporarily store raw data format video data that may be transferred to a video display peripheral component. The processing module 194 may include registers 218, a L1 cache 220, and a L2 cache 222 for temporarily storing raw data format instructions or operational data.

The memory controller 198 perform memory mapping, EC data encoding, EC data decoding, EC data slice routing, EC data slice retrieval, EC data slice storage, raw data retrieval, and/or raw data storage. In this capacity, the memory controller 198 determines the file type format (e.g., raw data or EC data slices) to utilize when storing the data object. The determination may be based on one or more of a predetermination, a resiliency goal, a performance goal, a data object type, a user affiliation, and/or any other factor to improve the efficiency and/or performance of the computing core. For example, speed of access may be the most important factor when storing a raw format application in main memory to be presently executed by the processing module 194. In another example, the resiliency of never losing the completed results data of an application may be more important than any other factor when storing EC data slices format completed results data in the WAN DSN memory 214.

The memory controller 198 coordinates the storage, reading, and routing data in a raw format and/or in an error-coded format (e.g., EC data slices). For example, data (e.g., one or more of OS instructions, application instructions, active application configuration data, active application results data, and/or any other data files required for fast computing core operation) conveyed between the memory controller and the main memory 200 may be in the raw format and/or in the error-coded format. As another example, data conveyed between the memory controller and the processing module 194 is the raw format. As yet another example, data conveyed between the memory controller and the video processing unit 196 is the raw format.

BIOS data conveyed between the memory controller 198 and the plurality of ROM is done in the error-coded format. Data conveyed between the memory controller and the non-core memory of the NAND flash 210, the hard drive 212, and/or the LAN/WAN memory 214 may in the raw format and/or the error-coded format. Similarly, data conveyed between the memory controller and a peripheral component may be in the raw format or in the error-coded format.

Figure 14:
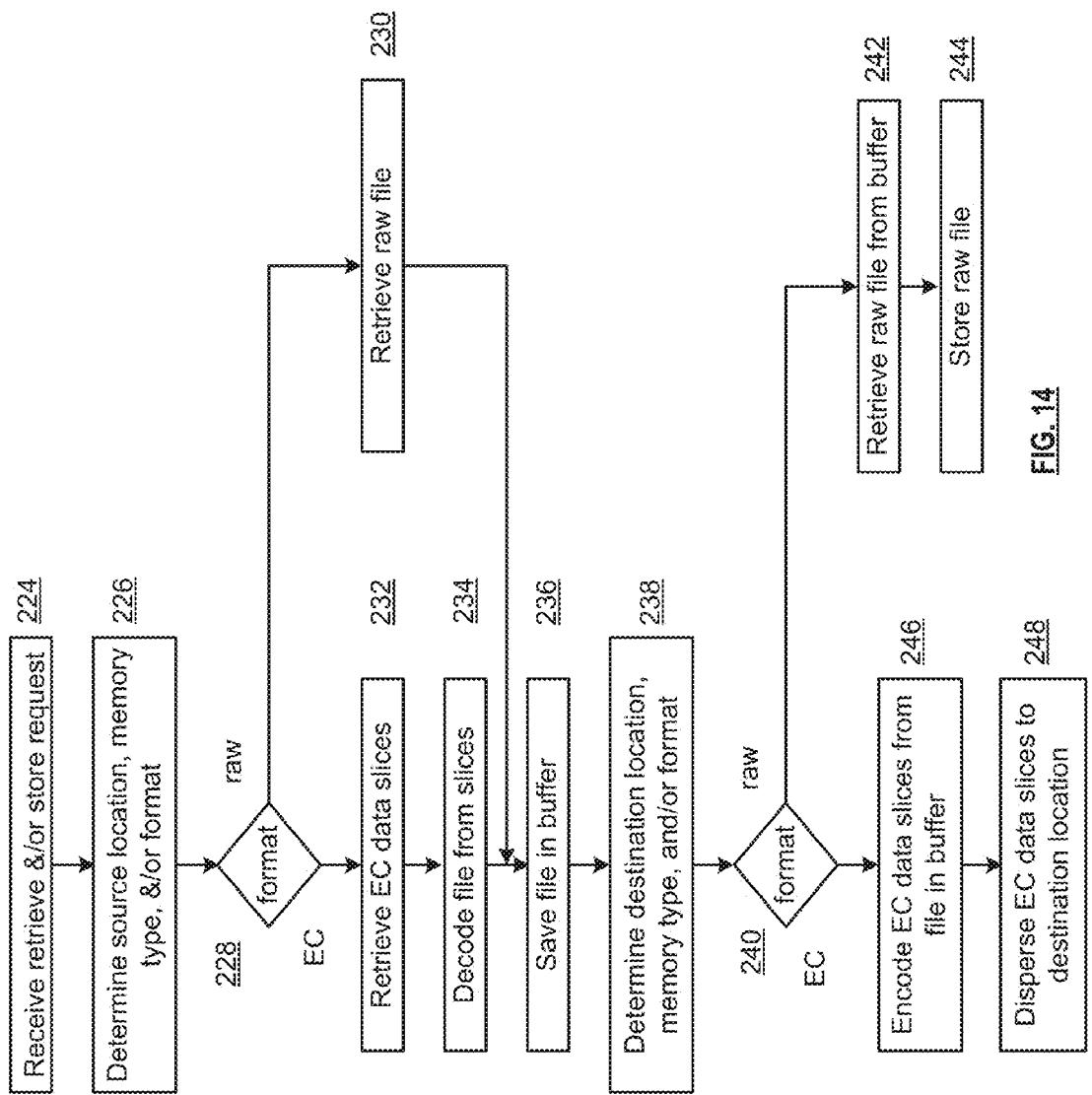
FIG. 14 is a logic diagram of another embodiment of a method for data handling in accordance with the present invention.

FIG. 14 is a logic diagram of another embodiment of a method for data handling where the memory controller transfers data from one memory to another. The memory controller receives a retrieve and/or store request from the processing module 224. The memory controller determines a source location, memory type, and format based on vault parameters and the DSN data to physical memory lookup table 226. For example, the source location may be addresses within one or more types of memory including the main memory, the NAND flash, the hard drive, the LAN DSN memory, and/or the DSN WAN memory. The format may be raw or EC data slices with a set of error control parameters (e.g., error coding algorithm, number of pillars, segment size) 228. The memory controller retrieves the raw format file or data object when the format is raw 230.

The memory controller retrieves the EC data slices when the format is EC data slices 232 and decodes the EC data slices into the raw format data object based on the format 234 and save the raw file or data object in the buffer 236. The memory controller determines a destination location, memory type, and format based on vault parameters and the DSN data to physical memory lookup table 238. The location, memory type, and format may be different than the source location, memory type, and format to realize a different set of resiliency and performance characteristics 240. For example, a dormant file that is in WAN memory may be error coded and dispersed to provide good protection. The dormant file may be required to operate in main memory with more speed of successive access steps. The memory controller then retrieves the raw format file or data object when the destination file format is raw 242 and stores it in the destination location 244.

The memory controller encodes the raw format data object in the buffer as EC data slices when the destination format is EC data slices 246. The memory controller disperses the EC data slices by storing the EC data slices in the memory devices based on the destination location and the DSN data to physical memory lookup table 248.

Figure 15:
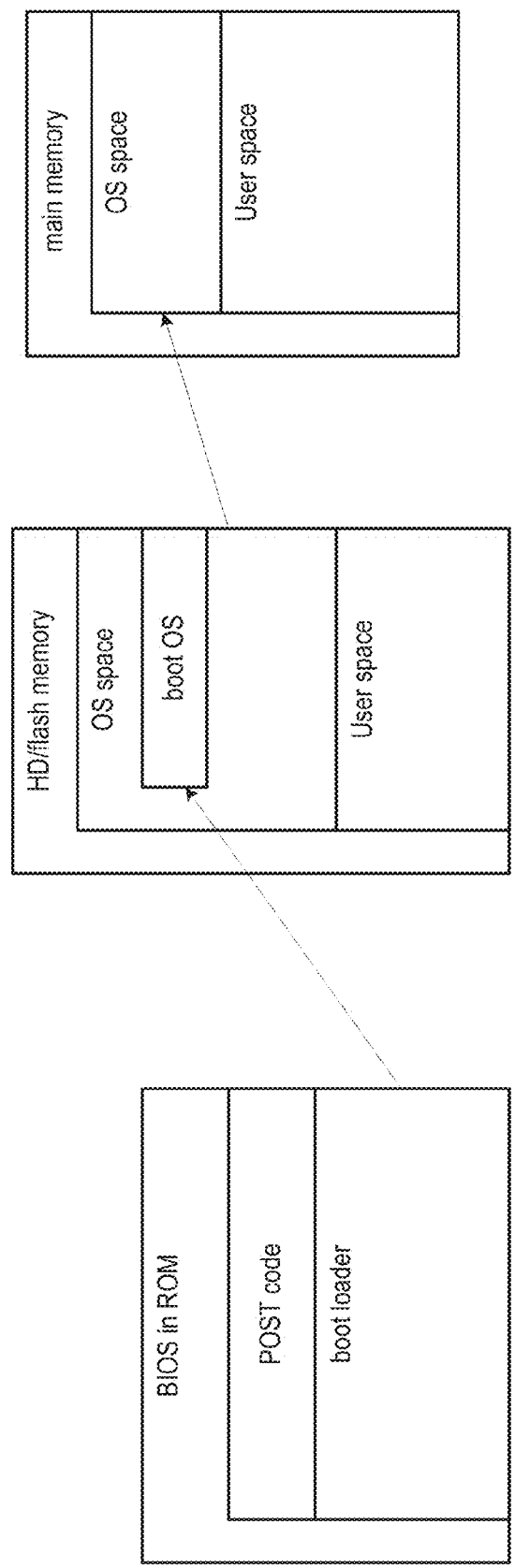
FIG. 15 is a schematic block diagram of another embodiment of a memory mapping in accordance with the invention.

FIG. 15 is a schematic block diagram of another embodiment of a memory mapping including a ROM memory map, a hard drive (HD)/flash memory map, and a main memory map. The ROM memory map includes BIOS, power on self test (POST) code, and a boot loader. The HD/flash memory map includes user space and OS space. The main memory includes OS space and user space. The memory maps indicate a typical boot process where BIOS executable instructions invoke transfer of the OS to the OS space in main memory.

The processing module requests a boot address in ROM upon startup (e.g., address FFFF). The processing module directly executes BIOS and POST instructions from the ROM which includes testing the computing core hardware and initializing elements that may require an initialization sequence (e.g., the video processing unit). The processing module determines where the boot OS is located in the HD/flash memory map based on the BIOS instructions. The processing module then executes the boot OS instructions to load the OS from the OS space of the HD/flash memory into the OS space of the main memory. Once the OS instructions are loaded, the processing module executes them.

Figure 16:
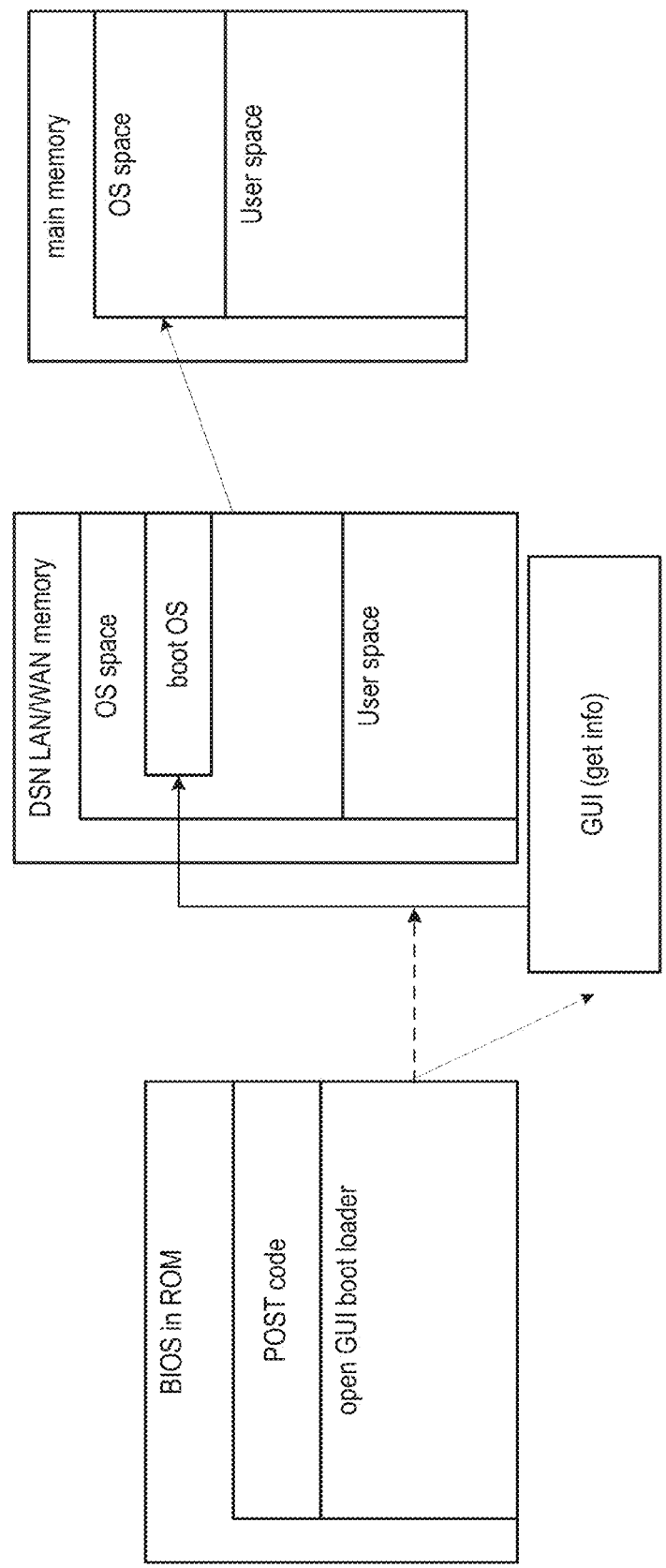
FIG. 16 is a schematic block diagram of another embodiment of a memory mapping in accordance with the invention.

FIG. 16 is a schematic block diagram of another embodiment of a memory mapping including a ROM memory map, a DSN LAN/WAN memory map, a GUI function, and a main memory map. The ROM memory map includes BIOS, power on self test (POST) code, and an open GUI boot loader. The DSN LAN/WAN memory map includes user space and OS space. The main memory includes OS space and user space. The memory maps indicate a boot process where BIOS executable instructions are decoded from EC data slices and executed to invoke retrieval and decoding of OS EC data slices, which are transferred to the OS space in main memory.

The processing module requests a boot address upon startup (e.g., address FFFF). The memory controller retrieves BIOS instructions and the open GUI boot loader instructions, both of which may be stored as EC data slices in the DSN memory (e.g., BIOS ROM, non-core memory, hard drive, LAN/WAN memory). The memory controller decodes the EC data slices and stores the decoded instructions in the OS section of main memory or in the memory controller. The processing module executes the instructions to test the computing core, initialize the elements requiring initialization, and the processing module may determine which user is powering up the computing core by requesting a login via the open GUI boot loader instructions. The processing module may determine an OS variant based on the login and vault for this user. The memory controller retrieves the EC data slices for the OS variant from the OS space of the DSN memory. The memory controller decodes the EC data slices to produce the OS variant in raw format. The memory controller completes the BIOS and POST instructions followed by transferring the OS variant to the OS space within the main memory. The memory controller fetches OS instructions for execution by the processing module.

In an example of operation, the processing module detects a boot-up of the computing device. The detection may be based on a power up sequence that directs the processing module to fetch a predetermined address (e.g., such as $FFFF for a 16 bit address of a computing device). The processing module addresses, via the memory controller, a distributed basic input/output system (BIOS) memory to retrieve a plurality of error coded BIOS data slices. The distributed BIOS memory may include a plurality of memories and/or a plurality of read-only memories (ROM) that function. The plurality of memories and/or the plurality of read-only memories (ROM) may include one or more of but not limited to a plurality of ROM memory devices for inclusion in a computing core, a plurality of local area network (LAN) memory devices, and/or a plurality of wide area network (WAN) memory devices. A memory of the plurality of memories and/or the plurality of read-only memories (ROM) may include one or more of but not limited to a read only memory (ROM) device, an erasable programmable read only memory (EPROM) device, an electronically erasable programmable read only memory (EEPROM) device, a nonvolatile random access memory (NVRAM), a flash memory device, a compact disc read only memory (CD-ROM) device, and/or a digital video disc read only memory (DVD-ROM) device. The plurality of memories and/or read-only memories may operably couple to the memory controller via at least one of an input output (IO) controller and/or an input output (IO) interface.

In the example of operation, the processing module executes a graphical user interface (GUI) function of a GUI boot loader to receive account information. The account information may include one or more of but not limited to a user identifier (ID), a vault identifier (ID), a password, and/or a password hash. The processing module determines the addressing of the distributed BIOS memory based on the account information. For example, the processing module determines the address of the distributed BIOS memory based on a table lookup for the user ID and vault ID. The distributed BIOS memory may include one or more of but not limited to a local memory address, a local area network (LAN) memory address, and/or a wide area network (WAN) memory address.

In the example of operation, the processing module reconstructs BIOS data from the plurality of error coded BIOS data slices using an error coding dispersal function and may store the plurality of error coded BIOS data slices in the main memory. The error coded dispersal function includes one or more of but not limited to a forward error correction function, an information dispersal algorithm (IDA), turbo coding, convolutional coding, trellis coding, and/or Reed-Solomon coding.

In the example of operation, the processing module boots of the computing device in accordance with the BIOS data by generating and executing BIOS instructions based on the BIOS data. The BIOS instructions may include one or more of but not limited to computing device initialization instructions, computing device test instructions, and/or operating system (OS) boot-up instructions. In an instance of generating OS boot-up instructions, the processing module may identify an OS, addresses a distributed OS memory to retrieve a plurality of error coded OS data slices, and reconstruct an OS data segment from the plurality of error coded OS data slices using a second error coding dispersal function.

In another instance of generating OS boot-up instructions, the processing module may identify the OS, address the distributed OS memory to retrieve a first plurality of error coded OS data slices, and reconstruct a first OS data segment from the first plurality of error coded OS data slices using the second error coding dispersal function. In the next step of the instance, the processing module determines whether to retrieve a second plurality of error coded OS data slices. The processing module addresses the distributed OS memory to retrieve the second plurality of error coded OS data slices and reconstructs a second OS data segment from the second plurality of error coded OS data slices using the second error coding dispersal function when the processing module determines that the second plurality of error coded OS data slices is to be retrieved.

Figure 17:
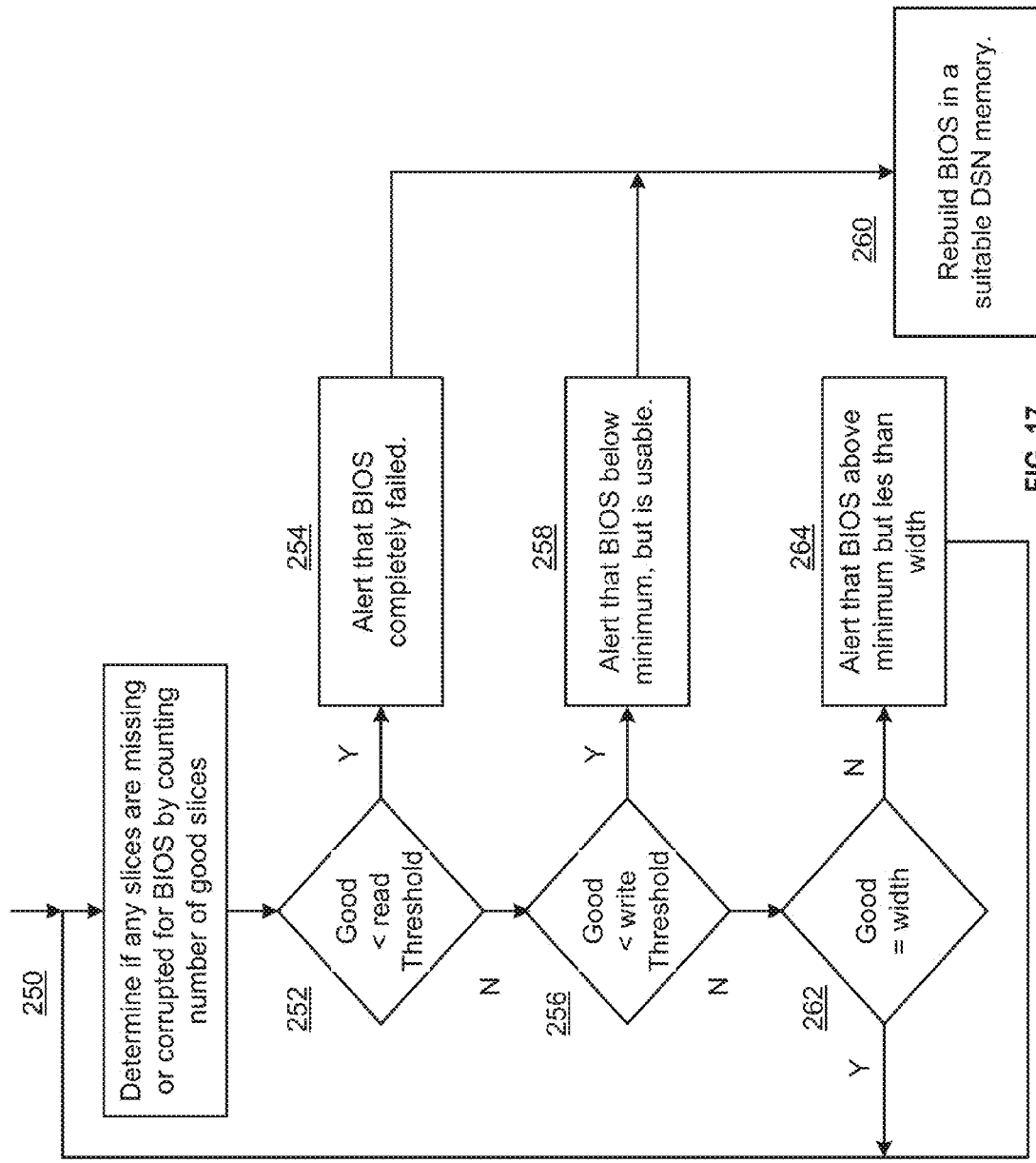
FIG. 17 is a logic diagram of an embodiment of a method for BIOS alerting in accordance with the present invention.

FIG. 17 is a logic diagram of an embodiment of a method that begins with the memory controller scanning the BIOS EC data slices from time to time to determine if there are missing or corrupted slices 250. The determination of corrupted EC data slices may be based on calculating a CRC for the present EC data slice and comparing the calculated CRC to a stored CRC. The determination of missing EC data slices may be based on verifying that each slice is present as listed for the BIOS EC data slices in the slice name to physical DSN memory address table. For example, the memory controller may determine where each slice is stored in the plurality of ROM DSN memories followed by a retrieval to verify how many slices are still present for each data segment of the BIOS data object.

The memory controller accesses the user vault to determine the error control parameters including the read threshold, a write threshold, and the pillar width. The read threshold is the minimum number of recovered slices required to decode the data segment and rebuild any slice. The write threshold is the minimum number of good slices left after which the memory controller may rebuild all of the slices to the full pillar width. For example, if the write threshold is seven and seven good slices still exist out of eight original slices (e.g., width=8), then no action may be taken. In another example, if the write threshold is seven and six good slices still exist out of eight original slices (e.g., width=8), then the two missing slices may be rebuilt and re-stored in a suitable memory (e.g., not a ROM since it is read only but non-core memory or other).

The memory controller compares the number of good slices for a data segment to the read threshold 252. The memory controller may generate an alert that the BIOS has completely failed if the number of good slices is less than the read threshold 254. The memory controller may not be able to rebuild the BIOS data object from the remaining good slices 260 (e.g., from the ROM stored location). The computing core responds to the failure alert by not allowing the computing core to restart by choice until a substitute BIOS is arranged. The memory controller arranges for a substitute BIOS by accessing DSN WAN memory to find a suitable up to date BIOS.

The memory controller may compare the number of good slices for a data segment to the write threshold when the number of good slices is not less than the read threshold 256. The memory controller may generate an alert that the BIOS is below minimum if the number of good slices is less than the write threshold 258. The memory controller is able to rebuild the BIOS data object from the remaining good slices (e.g., from the ROM stored location) and stores the rebuilt BIOS in a suitable DSN memory 260. The computing core may respond to the failure alert by recommending that the computing core not restart by choice until a substitute BIOS is arranged.

The memory controller compares the number of good slices for a data segment to the pillar width when the number of good slices is not less than the write threshold 262. The memory controller generates an alert that the BIOS is above minimum, but less than the width if the number of good slices is not equal to the pillar width 264. The memory controller is able to recover the BIOS data object from the remaining good slices (e.g., from the ROM stored location) upon restart. The computing core may respond to the failure alert by recommending that the computing core not restart by choice until a substitute BIOS is arranged.

In another example of operation, the memory controller determines whether a BIOS data slice of a plurality of error coded BIOS data slices has a slice error. The memory controller reconstructs BIOS data from other BIOS data slices of the plurality of error coded BIOS data slices using an error coding dispersal function (e.g., de-slice and decode) to produce reconstructed BIOS data when the memory controller determines that the BIOS data slice has the slice error. The memory controller rebuilds the plurality of error coded BIOS data slices from the reconstructed BIOS data to produce a rebuilt plurality of error coded BIOS data slices (e.g., encode and slice). The memory controller facilitates storage of the rebuilt plurality of error coded BIOS data slices. For example, the memory controller may store the rebuilt plurality of error coded BIOS data slices in a non-volatile main memory.

Figure 18:
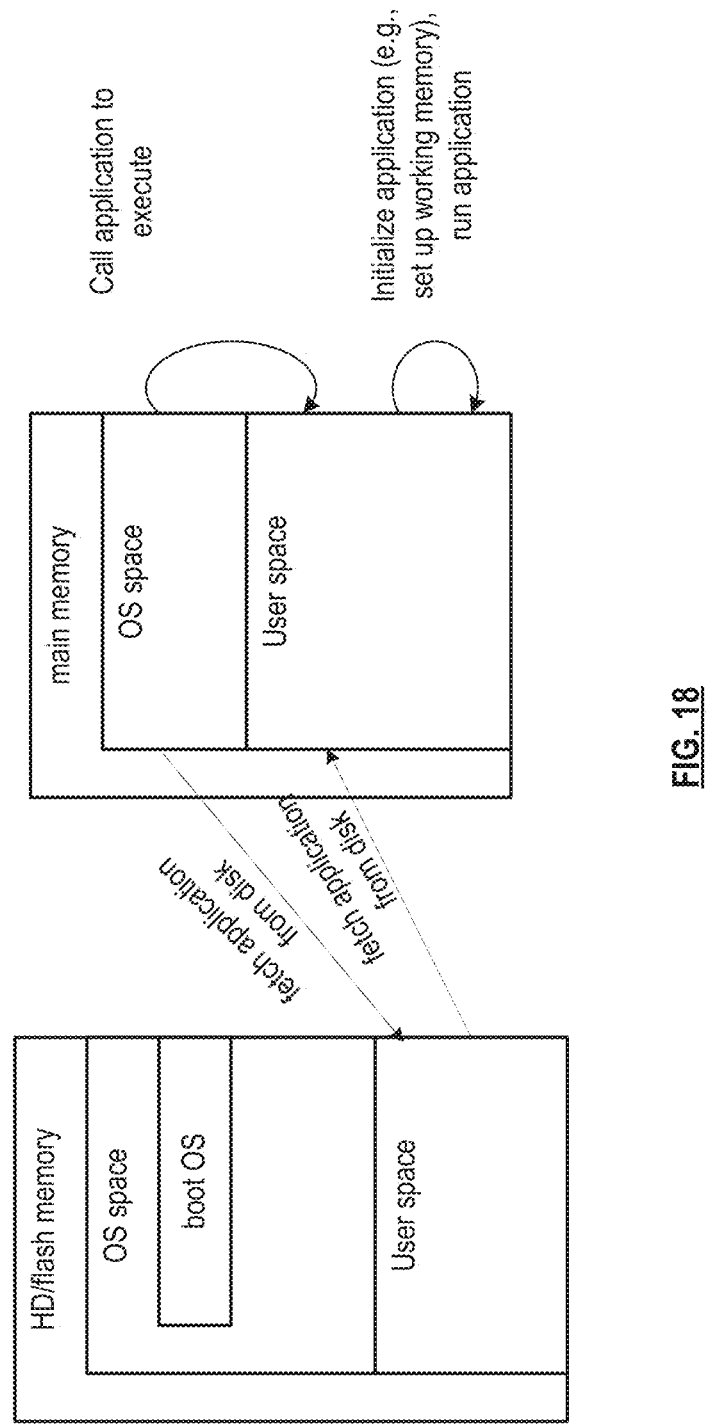
FIG. 18 is a schematic block diagram of another embodiment of a memory mapping in accordance with the invention.

FIG. 18 is a schematic block diagram of another embodiment of a memory mapping including the hard drive (HD)/ flash memory map, and the main memory map. The HD/flash memory map may include user space and OS space. The HD/flash memory user space may include stored applications. The main memory may include OS space and user space. The memory map may indicate a typical sequence where an application is transferred from the HD/flash memory user space to the main memory user space for execution by the processing module.

The processing module executes OS instructions from the main memory OS space to invoke an application. The processing module determines where the application is located in the HD/flash memory map based on a table lookup of application to physical storage location. The processing module executes OS instructions to load the application from the user space of the HD/flash memory into the user space of the main memory. The application may include application executable instructions, configuration parameters, and user preferences. The processing module executes instructions from the OS to initialize the application in main memory, which may include allocating working memory in the main memory user space. The processing module executes application executable instructions under control of an OS task manager.

Figure 19:
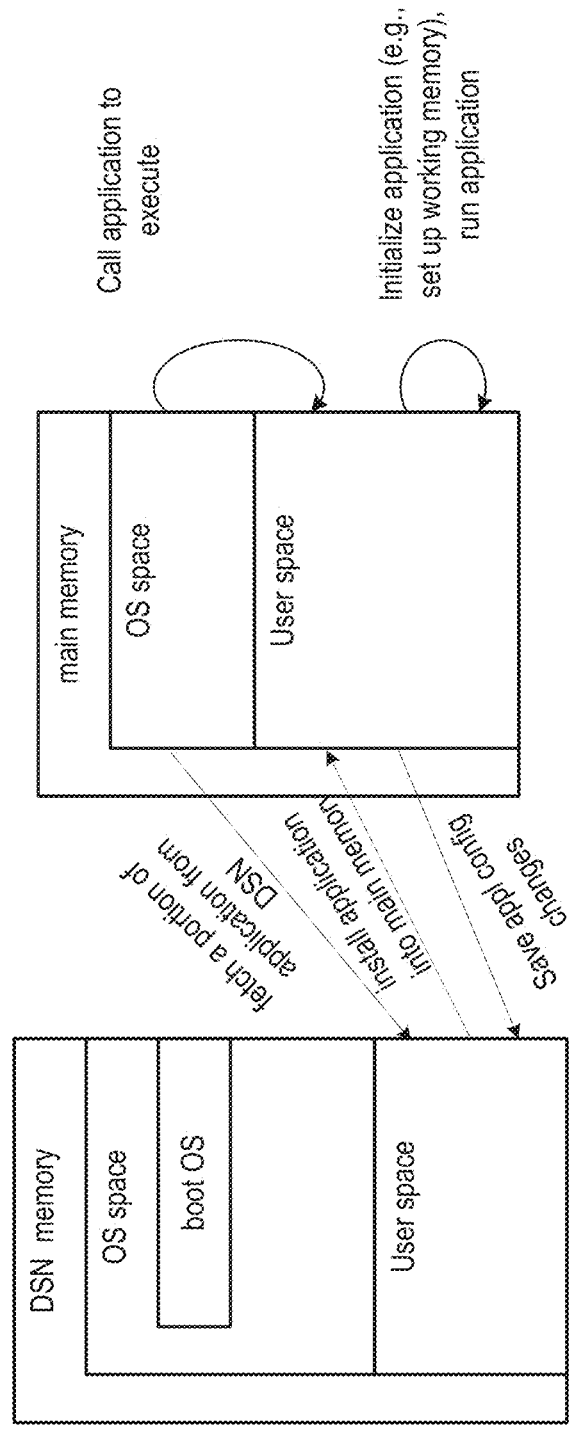
FIG. 19 is a schematic block diagram of another embodiment of a memory mapping in accordance with the invention.

FIG. 19 is a schematic block diagram of another embodiment of a memory mapping including the DSN memory map, and the main memory map. The DSN memory map may include user space and OS space across physical memories including one or more of HD/flash memory, DSN LAN memory, and DSN WAN memory. The main memory may include OS space and user space. The memory maps may indicate an application activation process where EC data slices containing application executable instructions, configuration parameters, and user preferences may be retrieved from the DSN memory, decoded into raw data, and utilized.

The processing module executes OS instructions to invoke the application by requesting the memory controller fetch the application from DSN memory. The memory controller accesses the DSN data to physical memory lookup table to determine where the application EC data slices are stored. In an example, the EC data slices are dispersed in the DSN LAN memory. In another example, the EC data slices are dispersed in the DSN WAN memory. In another example, the EC data slices are dispersed across both the DSN LAN and DSN WAN memories. In another example, the EC data slices are dispersed across the HD/flash memory, the DSN LAN memory and the DSN WAN memory.

In an example, the read width number of EC data slice pillars per data segment are stored in a portion of the DSN memory with a preferred performance metric (e.g., low access latency) while the remaining pillars are stored in another portion of the DSN memory. For instance, six pillars may be stored in three memories of the DSN LAN memory and two pillars may be stored in two DSN WAN memories if the pillar width is eight and the read threshold is six. In this instance, a failure of any one of the three DSN LAN memories can be overcome by accessing the two DSN WAN memories in addition to the two remaining DSN LAN memories. The memory controller may fetch the application in the quickest amount of time from the three DSN LAN memories when there are no failed memories.

The memory controller fetches the application EC data slices from the minimum number of pillars (e.g., read threshold) with the preferred performance metric by requesting the memory controller fetch the application from DSN memory. The memory controller fetches additional pillars of EC data slices from the pillars with the next best preferred performance metric when one or more of the pillars with the preferred performance metric are unavailable or do not produce the requested EC data slices.

The memory controller decodes the application EC data slices to produce the application in the raw data format and stores the raw data format application in main memory or the memory controller may store the raw data format application in a portion of the main memory and a portion of DSN memory. The memory controller fetches the application initialization instructions and executes them to establish the working memory in main memory and/or in the DSN memory. Next, the memory controller fetches the application instructions and the processing module executes them.

The memory controller saves the application configuration parameters and user preferences in the DSN memory when the processing module initiates an application shut down set of instructions. The memory controller determines the portion of the DSN memory to utilize to save the application configuration parameters and the user preferences based on one or more of an activity metric (e.g., how frequent is this application activated), a predetermination, a user lookup table, an application lookup table, and/or the current performance metric of the DSN memory.

In an example of operation, the processing module and/or memory controller may perform the steps of a method to load an application for execution based on retrieving EC data slices and reconstructing instructions on the application as described below. The processing module detects selection of an application. For example, the processing module receives an application selection message. The at least one of the memory controller and/or the processing module addresses a distributed application memory to retrieve a plurality of error coded program data slices and a plurality of error coded configuration data slices. In an embodiment, the at least one of the memory controller and/or the processing module addresses a first memory of the distributed application memory to retrieve the plurality of error coded program data slices and addresses a second memory of the distributed application memory to retrieve the plurality of error coded configuration data slices. The at least one of the memory controller and/or the processing module addresses the distributed application memory by one or more of addressing at least one of a plurality of local non-volatile memory devices, addressing at least one of a plurality of LAN memory devices and/or addressing at least one of a plurality of WAN memory devices.

In the next step of the example, the at least one of the memory controller and/or the processing module reconstructs a data segment of a program from the plurality of error coded program data slices using an error coding dispersal function and the at least one of the memory controller and/or the processing module reconstructs a data segment of configuration information from the plurality of error coded configuration data slices using a second error coding dispersal function wherein the second error coding dispersal function is substantially the same as the error coding dispersal function. In another instance, the second error coding dispersal function is not substantially the same as the error coding dispersal function. At least one of the memory controller and/or the processing module stores the data segment of the program and the data segment of the configuration information in the main memory.

In another example, the at least one of the memory controller and/or the processing module detects a change in configuration information. For example, the computing core may change the configuration information when the computing core receives a preference change message. The at least one of the memory controller and/or the processing module updates the configuration information to produce updated configuration information and facilitates storage of the updated configuration information when the at least one of the memory controller and/or the processing module detects the change in configuration information. The at least one of the memory controller and/or the processing module may facilitate storage of the updated configuration information by encoding and slicing the updated configuration information in accordance with the second error coding dispersal function to produce a new plurality of error coded configuration data slices. The at least one of the memory controller and/or the processing module addresses the distributed application memory and/or main memory to store the new plurality of error coded configuration data slices. In an embodiment, the at least one of the memory controller and/or the processing module may address the main memory to store the updated configuration information.

In an example of operation, the processing module and/or memory controller may perform the steps of a method to close an application as described below. The processing module detects closing of an application. For example, the processing module receives an application close message. The at least one of the memory controller and/or the processing module reads a data segment of configuration information of the application from the main memory. The at least one of the memory controller and/or the processing module generates a plurality of error coded configuration data slices using a second error coding dispersal function from the data segment and the at least one of the memory controller and/or the processing module addresses a distributed application memory for storage of the plurality of error coded configuration data slices when enabled. For instance, the function described above may always be enabled. In another instance, the function described above may only be enabled when the at least one of the memory controller and/or the processing module determines that the configuration information has changed. The at least one of the memory controller and/or the processing module addresses the distributed application memory by one or more of addressing at least one of a plurality of local non-volatile memory devices, addressing at least one of a plurality of LAN memory devices, and/or addressing at least one of a plurality of WAN memory devices.

Figure 20:
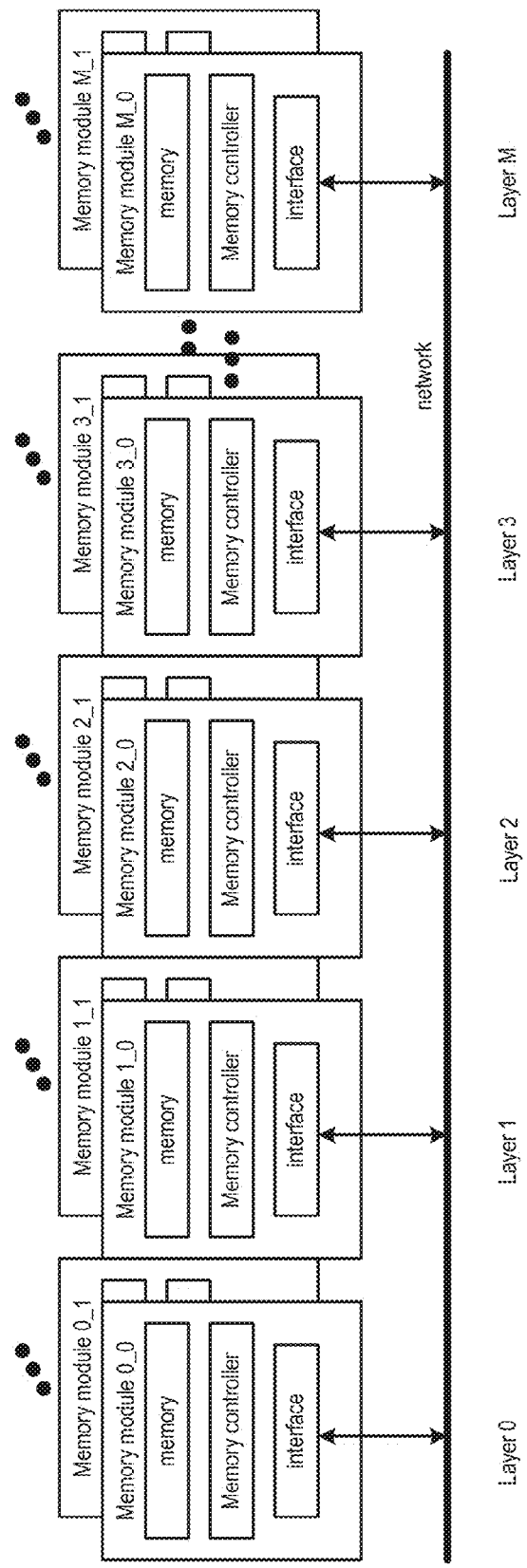
FIG. 20 is a schematic block diagram of an embodiment of a memory system in accordance with the invention.

FIG. 20 is a schematic block diagram of an embodiment of a memory system that includes a plurality of M+1 memory layers each with one or more memory modules operably coupled by a network. The memory modules of the memory layer may share similar layer attributes including one or more of resiliency, cost, access latency, capacity and/or other factors that describe efficiency, effectiveness, and performance. For example, memory modules of layer 0 may have the lowest access latency and highest normalized cost of all the layers while the memory modules of layer M may have the lowest normalized cost and highest latency of all the layers. The memory module may be included in the user device, the memory system, the database, the server, the router, and/or the modem. A more specific example of the memory system will be discussed in greater detail with reference to FIG. 21.

The memory module may include a memory, the memory controller, and the interface to the other memory modules via the network. The memory may include one or more memory elements of the hard drive, the NAND flash, the ROM, the main memory, the RAM memory, the non-core memory, and an optical drive. The memory modules of the same memory layer may share similar memory elements thus producing similar layer attributes. The interface may provide an electrical, wireless, and/or optical connection between the memory module and the network. The network may include one or more of a computing core backplane, the LAN, the WAN, and/or any other wire line and/or wireless communications.

The memory controller may include the dispersed storage (DS) processing module and may function to coordinate the reading of data and writing of data, including data which is stored in the memory of memory modules. For example, the memory controller may create and disperse EC data slice pillars of a data object across layer 0 memory modules. In another example, the memory controller may transfer EC data slices from the layer 2 memory modules to the layer 1 memory modules without decoding or re-encoding EC data slices. In another example, the memory controller may retrieve EC data slices from the layer 3 memory modules and decode the EC data slices to produce the raw data object.

The memory controller may re-encode the raw data object into EC data slices of a different error control parameter set and store the EC data slices in layer 1 memory modules. The error control parameter set may include the pillar width, the write threshold, the read threshold, the coding scheme, the pre-data manipulation parameters, the post-data manipulation parameters, and/or other parameters to specify how EC data slice are constructed. For example, the memory controller may utilize a first set of error control parameters at layer 0 including the pillar width four and the read threshold three, and the memory controller may utilize a second set of error control parameters at layer 3 including the pillar width sixteen and the read threshold ten. The memory controller may match the error control parameters to the layer attributes to optimize effectiveness and performance. For example, the memory controller in memory module 0_0 may utilize main memory in the memory of memory modules 0_0 and 0_1 as memory layer 0 and it may utilize a hard drive set in the memory of memory modules 2_0 and 2_1 as memory layer 2 via the network.

The memory layer reference and utilization may be with reference to a particular memory module position and relationship (e.g., proximity via the network) to the other memory modules. For example, the memory controller in memory module 1_0 may utilize main memory in the memory of memory modules 1_0 and 1_1 as memory layer 0 and it may utilize a hard drive set in the memory of memory modules 3_0 and 3_1 as memory layer 2 via the network.

The memory controller may store the same data object with the same or different error control parameters at two or more memory layers in accordance with a duplication parameter. The duplication parameter may specify that the data object be converted into one, two, or more sets of EC data slices where each set may have a different error control parameter set and that the EC data slices be stored in one, two, or more memory layers to provide another measure of resiliency. For example, the memory controller may initiate a storage sequence by determining the duplication parameter where the determination is based on a vault table lookup, the data object type, a user identifier, a resiliency indicator, and/or a prioritization indicator. The memory controller may produce a first set of EC data slices utilizing a first set of error control parameters (e.g., pillar width 4, read threshold 3) and a second (duplicate) set of EC data slices utilizing a second set of error control parameters (e.g., pillar width 8, read threshold 6). The memory controller may store the first set of EC data slices in memory layer 1 memory modules 1_0 and 1_1 and the memory controller may store the second (duplicate) set of EC data slices in memory layer 3 memory modules 3_0 and 3_1.

Figure 21:
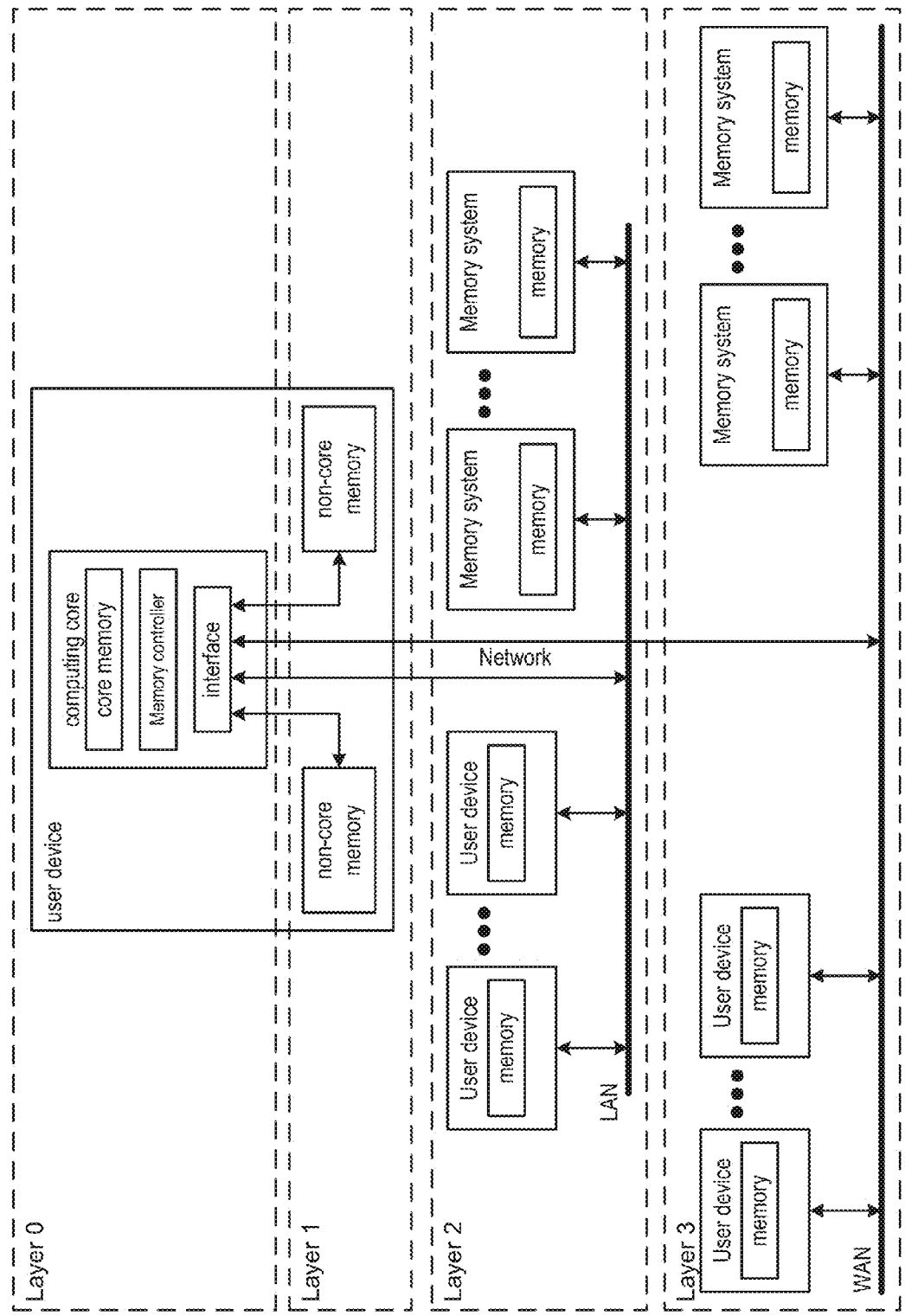
FIG. 21 is a schematic block diagram of another embodiment of a memory system in accordance with the invention.

FIG. 21 is a schematic block diagram of another embodiment of a memory system that includes a plurality of user devices and a plurality of memory systems mapped to memory layers 0-3 each with one or more memories operably coupled by a network. The layer 0 and 1 user device may include a computing core and one or more non-core memories. The computing core may include the core memory at layer 0, the memory controller, and the interface to the network. The layer 2 and layer 3 user devices and layer 2 and layer 3 memory systems may include the memory operably coupled to the network via the interface. Memories of the each memory layer may share similar layer attributes including one or more of resiliency, cost, access latency, capacity and/or other factors that describe efficiency, effectiveness, and performance. For example, memory of layer 0 may have the lowest access latency and highest normalized cost of all the layers while the memory of layer 3 may have the lowest normalized cost and highest latency of all the layers. The memory may be included in the user device, the memory system, the database, the server, the router, and/or the modem.

The memory may include one or more memory elements of the hard drive, the NAND flash, the ROM, the main memory, the RAM memory, the non-core memory, and an optical drive. The memory modules of the same memory layer may share similar memory elements thus producing similar layer attributes. The interface may provide an electrical, wireless, and/or optical connection between the memory module and the network. The network may include one or more of a computing core backplane, the LAN, the WAN, and/or any other wire line and/or wireless communications.

The memory controller may include the dispersed storage (DS) processing module and may function to coordinate the reading of data and writing of data, including data which is stored in the memory of memory layers. For example, the memory controller may create and disperse EC data slice pillars of a data object across layer 0 core memory. In another example, the memory controller may transfer EC data slices from the layer 2 memory in the memory systems to the layer 1 non-core memory without decoding or re-encoding EC data slices. In another example, the memory controller may retrieve EC data slices from the layer 3 memory in the user devices and memory systems and decode the EC data slices to produce the raw data object for use by the computing core and/or to be stored in another layer.

Successive layers of memory may provide more data storage resiliency. The memory controller may utilize the non-core memory of layer 1 to overcome storage failure issues (e.g., core memory device failures) at layer 0. The memory controller may utilize the user device and memory system memory of layer 2 via the LAN (e.g., same site as the user device) to overcome storage failure issues (e.g., user device failure) at layers 0-1. The memory controller may utilize the user device and memory system memory of layer 3 via the WAN (e.g., different sites from the user device) to overcome storage failure issues (e.g., site failure) at layers 0-2.

The memory controller may re-encode the raw data object into EC data slices of a different error control parameter set and store the EC data slices in layer 1 non-core memory. The error control parameter set may include the pillar width, the write threshold, the read threshold, the coding scheme, the pre-data manipulation parameters, the post-data manipulation parameters, and/or other parameters to specify how EC data slice are constructed. For example, the memory controller may utilize a first set of error control parameters at layer 0 including the pillar width four and the read threshold three, and the memory controller may utilize a second set of error control parameters at layer 3 including the pillar width sixteen and the read threshold ten. The memory controller may match the error control parameters to the layer attributes to optimize effectiveness and performance. For example, the memory controller may utilize core memory in the computing core as memory layer 0 and it may utilize a hard drive set in the layer 2 non-core memory of the user device.

The memory controller may store the same data object with the same or different error control parameters at two or more memory layers in accordance with a duplication parameter. The duplication parameter may specify that the data object be converted into one, two, or more sets of EC data slices where each set may have a different error control parameter set and that the EC data slices be stored in one, two, or more memory layers to provide another measure of resiliency. For example, the memory controller may initiate a storage sequence by determining the duplication parameter where the determination is based on a vault table lookup, the data object type, a user identifier, a resiliency indicator, and/or a prioritization indicator. The memory controller may produce a first set of EC data slices utilizing a first set of error control parameters (e.g., pillar width 4, read threshold 3) and a second (duplicate) set of EC data slices utilizing a second set of error control parameters (e.g., pillar width 8, read threshold 6). The memory controller may store the first set of EC data slices in layer 1 non-core memory and the memory controller may store the second (duplicate) set of EC data slices in layer 3 memory. The method to duplicate data objects in the DSN memory in accordance with data object usage state will be discussed in greater detail with reference to FIGS. 22-23.

Figure 22:
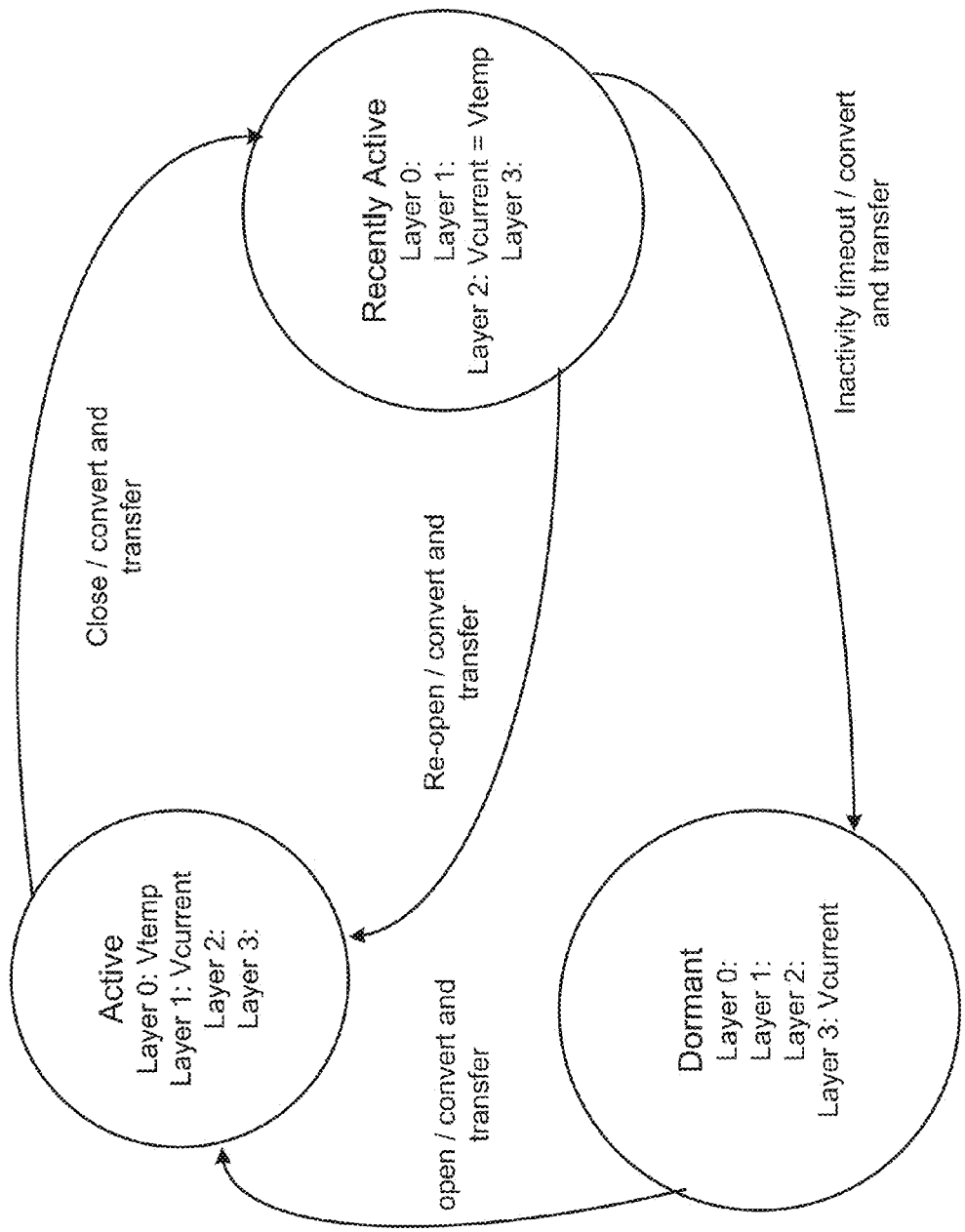
FIG. 22 is a state diagram of an example embodiment of a memory system in accordance with the invention.

FIG. 22 is a state diagram of an example embodiment of a memory system that includes three states of data object usage that may be utilized by the memory controller to optimize the DSN memory system for a desired balance of resiliency and performance. In an example, the memory controller may determine the balance to favor more resiliency at the compromise of slower performance. In another example, the memory controller may determine the balance to favor faster performance at the compromise of less resiliency.

The memory controller may provide the level of resiliency based on utilization of one or more memory layers where different error control parameters are utilized at different levels. The memory controller may provide the level of resiliency based on duplication where data objects stored at a first memory layer are duplicated at a second or more memory layer.

The memory controller may determine the level of resiliency based on a usage characteristic and/or the state of usage of the data object. The memory controller may determine the data object usage characteristic based on one or more of an average frequency of retrieval rate, an average duration of use, and an average frequency of storage rate. The memory controller may determine the state of usage (e.g., dormant, active, recently active) based on the instantaneous computing core usage of the data object and a timing parameter denoting the time since the last state transition.

In an example of operation that may favor speed, the data object resides in layer 3 memory as the current version in the dormant state. The memory controller may retrieve the data object EC data slices from the layer 3 memory when the memory controller receives an open file request from the computing core when the state is dormant. The memory controller changes the state to active and decodes the EC data slices into raw data. The memory controller stores the raw data in layer 0 memory as a temporary version for utilization and potential modification by the computing core. The memory controller encodes the raw data into EC data slices and disperses the EC data slices to memory layer 1 as the current version data object. The memory controller deletes the data object EC data slices at layer 3.

The memory controller encodes the raw format temporary version of the data object from layer 0 into EC data slices and disperses the EC data slices to memory layer 2 as the temporary version data object when the memory controller receives a close file command. The memory controller deletes the data object EC data slices at layers 0 and 1. The memory controller starts a timeout timer (e.g., a timer that starts at 1 minute and counts down). The memory controller may determine the timeout timer duration based on of one or more of a predetermination, an average frequency of retrieval rate, an average duration of use, an average frequency of storage rate, and an average time duration between subsequent file opens. The memory controller changes the state to recently active.

The memory controller may retrieve the data object temporary version EC data slices from the layer 2 memory when the memory controller receives an open file request from the computing core when the state is recently active and the timeout timer has not expired. The memory controller changes the state to active and decodes the EC data slices into raw data. The memory controller stores the raw data in layer 0 memory as a temporary version for utilization and potential modification by the computing core. The memory controller encodes the raw data into EC data slices and disperses the EC data slices to memory layer 1 as the current version data object. The memory controller deletes the data object EC data slices at layer 2.

The memory controller retrieves the EC data slices from memory 2 of the temporary version data object, decodes the EC data slices into the raw format and encodes the raw format temporary version of the data object into EC data slices and disperses the EC data slices to memory layer 3 as the current version data object when the memory controller detects the timeout timer expiration and the state is recently active. The memory controller deletes the data object EC data slices at layer 2. The memory controller changes the state to dormant.

Figure 23:
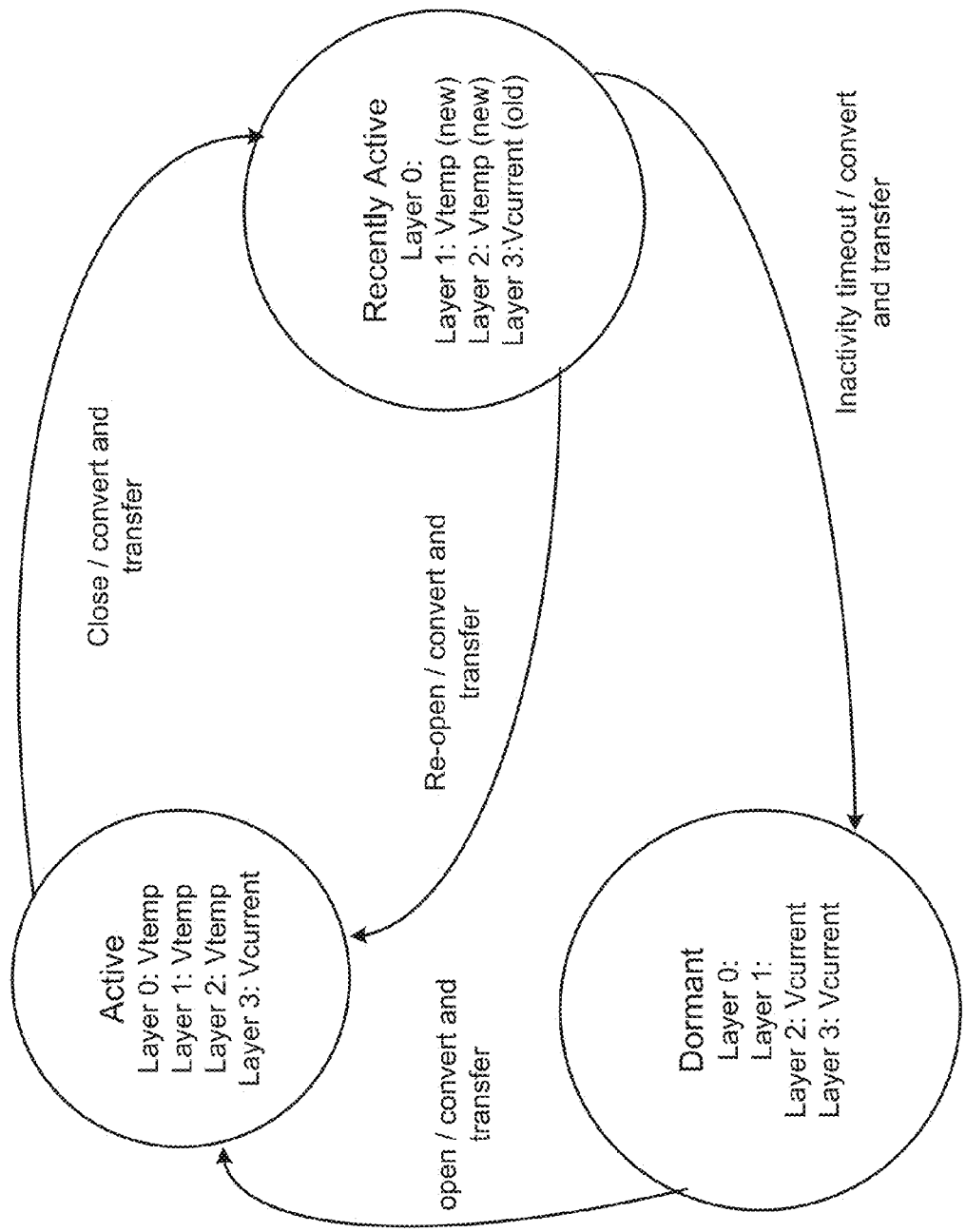
FIG. 23 is a state diagram of another example embodiment of a memory system in accordance with the invention.

FIG. 23 is a state diagram of another example embodiment of a memory system that includes three states of data object usage that may be utilized by the memory controller to optimize the DSN memory system for a desired balance of resiliency and performance. In an example, the memory controller may determine the balance to favor more resiliency at the compromise of slower performance. In another example, the memory controller may determine the balance to favor faster performance at the compromise of less resiliency.

The memory controller may provide the level of resiliency based on utilization of one or more memory layers where different error control parameters are utilized at different levels. The memory controller may provide the level of resiliency based on duplication where data objects stored at a first memory layer are duplicated at a second or more memory layer.

The memory controller may determine the level of resiliency based on a usage characteristic and/or the state of usage of the data object. The memory controller may determine the data object usage characteristic based on one or more of an average frequency of retrieval rate, an average duration of use, and an average frequency of storage rate. The memory controller may determine the state of usage (e.g., dormant, active, recently active) based on the instantaneous computing core usage of the data object and a timing parameter denoting the time since the last state transition.

In an example of operation that may favor resiliency, the data object resides in layers 2 and 3 memory as the current version in the dormant state. The memory controller may retrieve the data object EC data slices from the layer 2 memory (or layer 3 memory if layer 2 has failed) when the memory controller receives an open file request from the computing core when the state is dormant. The memory controller changes the state to active and decodes the EC data slices into raw data. The memory controller stores the raw data in layer 0 memory as a temporary version for utilization and potential modification by the computing core. The memory controller encodes the raw data into two sets of EC data slices and disperses the EC data slices to memory layer 1 and 2 as the temporary version data object. Note that the EC data slices at layer 3 are not deleted.

The memory controller encodes the raw format temporary version (newest version) of the data object from layer 0 into two sets of EC data slices and disperses the EC data slice sets to memory layers 1 and 2 as the temporary version data object when the memory controller receives a close file command and the state is active. The memory controller deletes the data object EC data slices at layer 0. The memory controller starts a timeout timer (e.g., a timer that starts at 1 minute and counts down). The memory controller may determine the timeout timer duration based on of one or more of a predetermination, an average frequency of retrieval rate, an average duration of use, an average frequency of storage rate, and an average time duration between subsequent file opens. The memory controller changes the state to recently active. Note that the EC data slices at layer 3 are not deleted and remain as the old version of the data object.

The memory controller may retrieve the data object temporary version EC data slices from the layer 2 memory (or layer 1 if layer 2 fails) when the memory controller receives an open file request from the computing core when the state is recently active and the timeout timer has not expired. The memory controller changes the state to active and decodes the EC data slices into raw data. The memory controller stores the raw data in layer 0 memory as a temporary version for utilization and potential modification by the computing core. The memory controller encodes the raw data into EC data slices and disperses the EC data slices to memory layers 1 and 2 as the temporary version data object.

The memory controller retrieves the EC data slices from memory layer 1 (or layer 2 if layer 1 fails) of the temporary version data object, and decodes the EC data slices into the raw format and encodes the raw format temporary version of the data object into two sets of EC data slices and disperses the EC data slices to memory layers 2 and 3 as the current version data object when the memory controller detects the timeout timer expiration and the state is recently active. The memory controller deletes the data object EC data slices at layer 1. The memory controller changes the state to dormant.

Figure 24:
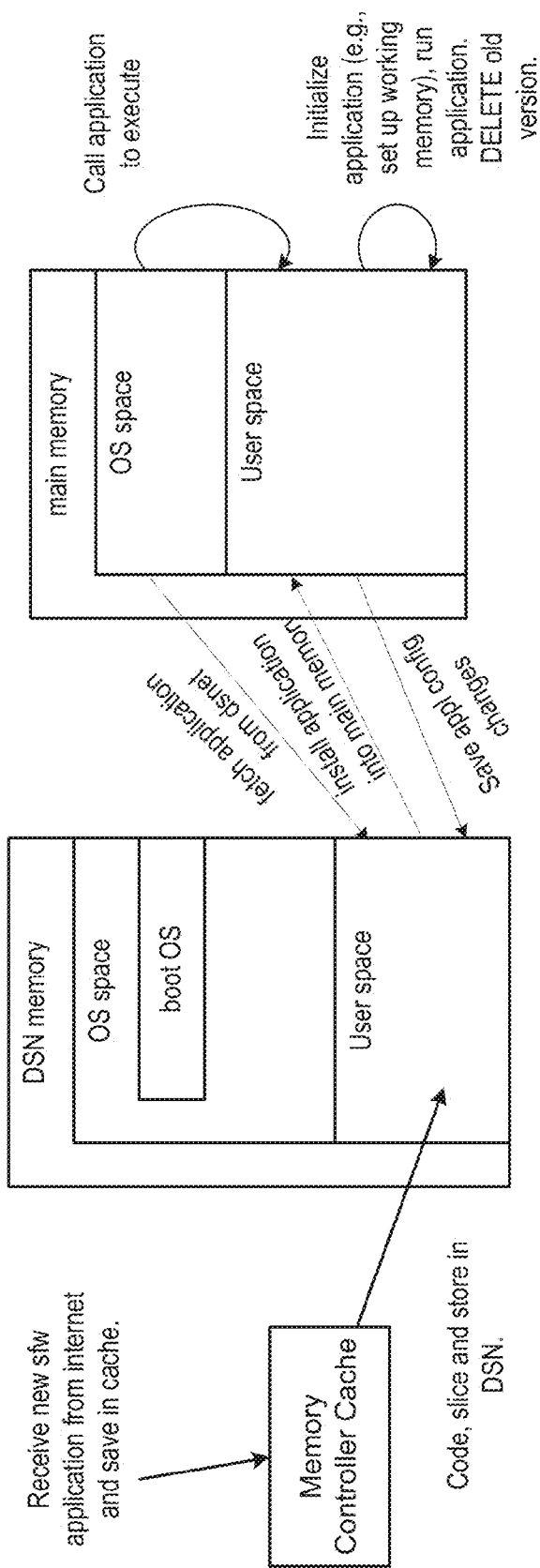
FIG. 24 is a schematic block diagram of another embodiment of a memory mapping in accordance with the invention.

FIG. 24 is a schematic block diagram of another embodiment of a memory mapping including the memory controller cache, the DSN memory map, and the main memory map. The DSN memory map may include user space and OS space across physical memories including one or more of HD/flash memory, DSN LAN memory, and DSN WAN memory. The main memory may include OS space and user space. The memory maps may indicate an application version update and activation process where a new application version may be received into the memory controller cache from an external entity (e.g., an application server on the internet) and the memory controller may create and store EC data slices for the new application version in the DSN memory. The memory controller may subsequently retrieve the new application EC data slices from the DSN memory, decode the slices into raw data, and provide the raw data format application to the computing core for execution. The memory controller may save EC data slices containing application executable instructions, configuration parameters, and user preferences.

The processing module executes OS instructions to invoke the application by requesting the memory controller fetch the application from DSN memory. The memory controller accesses the DSN data to physical memory lookup table to determine where the application EC data slices are stored. In an example, the EC data slices are dispersed in the DSN LAN memory. In another example, the EC data slices are dispersed in the DSN WAN memory. In another example, the EC data slices are dispersed across both the DSN LAN and DSN WAN memories. In another example, the EC data slices are dispersed across the HD/flash memory, the DSN LAN memory and the DSN WAN memory.

In an embodiment, the read width number of EC data slice pillars per data segment are stored in a portion of the DSN memory with a preferred performance metric (e.g., low access latency) while the remaining pillars are stored in another portion of the DSN memory. For example, six pillars may be stored in three memories of the DSN LAN memory and two pillars may be stored in two DSN WAN memories if the pillar width is eight and the read threshold is six. In this instance, a failure of any one of the three DSN LAN memories can be overcome by accessing the two DSN WAN memories in addition to the two remaining DSN LAN memories. The memory controller fetches the application in short amount of time from the three DSN LAN memories when there are no failed memories.

The memory controller fetches the application EC data slices from the minimum number of pillars (e.g., read threshold) with the preferred performance metric by requesting the memory controller fetch the application from DSN memory. The memory controller fetches additional pillars of EC data slices from the pillars with the next best preferred performance metric when one or more of the pillars with the preferred performance metric are unavailable or do not produce the requested EC data slices.

The memory controller decodes the application EC data slices to produce the application in the raw data format. The memory controller determines if the application version is current by requesting the latest version number from one of the external entity or from a version table stored in the DSN memory. The memory controller stores the raw data format application in main memory or the memory controller may store the raw data format application in a portion of the main memory and a portion of DSN memory when the memory controller determines that the application version from DSN memory is current.

The memory controller deletes the application EC data slices in the DSN memory (e.g., executable code only, not the configuration parameters and user preferences) and determines where to obtain the current application version when the application version from DSN memory is not current. The determination may be based on a DSN table entry and/or by requesting the current version location from the external entity. The memory controller requests the new version and temporarily stores the current version in the memory controller cache. The memory controller decodes the EC data slices in the cache of the current application version into the raw format when the current version application was obtained in EC data slice format. The memory controller stores the raw format application in main memory and encodes the raw format application into EC data slices for storage in the DSN memory. The memory controller stores the EC data slices in the DSN memory.

The memory controller fetches the application initialization instructions. The processing module executes the application initialization instructions to establish the working memory in main memory and/or in the DSN memory. Once set up, the memory controller fetches the application instructions and the processing module executes the application instructions.

The memory controller saves the application configuration parameters, and user preferences in the DSN memory when the processing module initiates an application shut down set of instructions. The memory controller determines the portion of the DSN memory to utilize to save the application configuration parameters, and user preferences based on one or more of an activity metric (e.g., how frequent is this application activated), a predetermination, a user lookup table, an application lookup table, and/or the current performance metric of the DSN memory.

FIG. 25 is a schematic block diagram of another embodiment of a memory system that includes a plurality of solid-state (SS) memory units 1-4, the DS processing module, and the interface. The SS memory units may include ROM, RAM, NAND flash memory. In an example, inexpensive NAND flash (relative to other flash) is utilized to provide a more resilient memory system (as compared to just a single inexpensive NAND flash) utilizing four pillars of EC data slices per data segment where the read threshold is three pillars.

The interface provides an electrical and/or optical coupling to the memory system. In an embodiment, the interface may replicate the electrical interface of a typical NAND flash. In another embodiment, the memory system may mimic a database system and may utilize a database access protocol to mimic a conventional file system interface and may be any one or more of network file system (NFS), flash file system (FFS), disk file system (DFS), small computer system interface (SCSI), internet small computer system interface (iSCSI), file transfer protocol (FTP), and web-based distributed authoring and versioning (WebDAV). In another embodiment, the database may utilize a dispersed storage network (DSN) protocol.

In an example of operation, the DS processing module may encode a received data object via the interface to produce a set of four pillar EC data slices per segment. The DS processing module may disperse the four pillar EC data slices amongst the four SS memory units 1-4 for all of the data segments of the data object.

In an embodiment, the DS processing module may rebuild corrupted or missing EC data slices from time to time to maintain the integrity of the data. In an example, the DS processing module may scan the SS memory units 1-4 for corrupted or missing data slices. The DS processing module may determine corrupted EC data slices when a comparison of a calculated CRC to a stored CRC does not match. The DS processing module may determine missing EC data slices when a comparison of entries in the DSN memory to physical address table does not match the actual stored EC data slices. The DS processing module may retrieve the good slices corresponding to the missing or corrupted slice and decode the good slices to produce the original raw data object. The DS processing module may encode the raw data object to produce reconstructed EC data slices. The DS processing module may store the reconstructed EC data slice corresponding to the corrupted or missing EC data slice.

In another example of operation, the DS processing module may receive a retrieve request via the interface. The DS processing module may determine the locations of the EC data slices for the data object by accessing the DSN memory to physical address table. The DS processing module may retrieve the minimum number (e.g., read threshold) of EC data slices corresponding to the data object and may decode the EC data slices to produce the original raw data object. The DS processing module may transmit the raw data object via the interface.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/ or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by a computer core, the method comprises:
   receiving a request to store a data result from a processing module;
   determining whether to store the data result in an error encoded format;
   when the data result is to be stored in the error encoded format:
   facilitating encoding the data result in accordance with a dispersed storage error coding function to produce one or more sets of encoded data slices, wherein the facilitating includes:
   buffering the data result;
   when the processing module is available, sending the data result and encoding instructions to the processing module;
   executing, by the processing module, the encoding instructions to error encode the data result to produce the one or more sets of encoded data slices; and
   receiving the one or more sets of encoded data slices from the processing module;
   determining where to store the one or more sets of encoded data slices; and
   providing the one or more sets of encoded data slices to one or more identified memories for storage.

2. The method of claim 1, wherein the determining whether to store the data result in an error encoded format comprises:
   accessing a memory map to determine that the data result is to be stored in the error encoded format.

3. The method of claim 1, wherein the determining where to store the one or more sets of encoded data slices comprises:
   accessing a memory map to determine the one or more identified memories.

4. The method of claim 1 further comprises:
   when the data result is to be stored in a non-error encoded format:
   determining where to store the data result; and
   providing the data result to an identified memory for storage.

5. The method of claim 1, wherein the data result comprises one of:
   a data result from executing one or more operating system instructions:
   a data result from executing one or more application instructions: and
   a data result from executing one or more software driver instructions.

6. The method of claim 1, wherein the one or more identified memories comprises one or more of:
   main memory;
   non-core memory;
   local area network (LAN) memory; and
   wide area network (WAN) memory.

7. The method of claim 1 further comprises:
   initially storing the data result in main memory in a non-error encoded format; and
   retrieving the data result from the main memory for the encoding.

8. A computing core comprises:
   a processing module operable to execute encoding instructions to error encode a data result to produce one or more sets of encoded data slices;
   main memory; and
   a memory controller operable to:
   receive a request to store the data result from the processing module;
   determine whether to store the data result in an error encoded format;
   when the data result is to be stored in the error encoded format:
   facilitate encoding the data result in accordance with a dispersed storage error coding function to produce the one or more sets of encoded data slices, wherein the facilitating includes:

buffering the data result; and
when the processing module is available:
  sending the data result and encoding instructions to the processing module; and
  receiving the one or more sets of encoded data slices from the processing module;
determine where to store the one or more sets of encoded data slices; and
provide the one or more sets of encoded data slices to one or more identified memories for storage.

9. The computing core of claim 8, wherein the memory controller is further operable to determine whether to store the data result in an error encoded format by:
accessing a memory map to determine that the data result is to be stored in the error encoded format.

10. The computing core of claim 8, wherein the memory controller is further operable to determine where to store the one or more sets of encoded data slices by:
accessing a memory map to determine the one or more identified memories.

11. The computing core of claim 8, wherein the memory controller is further operable to:
when the data result is to be stored in a non-error encoded format:
  determine where to store the data result; and
  provide the data result to an identified memory for storage.

12. The computing core of claim 8, wherein the data result comprises one of:
a data result from executing one or more operating system instructions:
a data result from executing one or more application instructions: and
a data result from executing one or more software driver instructions.

13. The computing core of claim 8, wherein the one or more identified memories comprises one or more of:
the main memory;
non-core memory;
local area network (LAN) memory; and
wide area network (WAN) memory.

14. The computing core of claim 8, wherein the memory controller is further operable to:
facilitate initially storing the data result in main memory in a non-error encoded format; and
retrieve the data result from the main memory for the encoding.

* * * * *